US012651530B2

(12) United States Patent
Small et al.

(10) Patent No.:  US 12,651,530 B2
(45) Date of Patent:       Jun. 9, 2026

(54) SYSTEMS AND METHODS FOR AUTOMATICALLY ASSIGNING VEHICLE IDENTIFIERS FOR VEHICLES

(71) Applicant: Uber Technologies, Inc., San Francisco, CA (US)

(72) Inventors: Samantha Doyle Small, San Francisco, CA (US); Steve Ayers, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 18/325,718

(22) Filed: May 30, 2023

(65) Prior Publication Data

US 2023/0316903 A1     Oct. 5, 2023

Related U.S. Application Data

(63) Continuation of application No. 15/930,574, filed on May 13, 2020, now Pat. No. 11,694,546.

(Continued)

(51) Int. Cl.
G08G 1/017          (2006.01)
G01C 21/34          (2006.01)
(Continued)

(52) U.S. Cl.
CPC ............. G08G 1/017 (2013.01); G01C 21/34 (2013.01); G08G 1/20 (2013.01); G05D 1/0088 (2013.01)

(58) Field of Classification Search
CPC .......... G08G 1/017; G08G 1/20; G01C 21/34; G01C 21/3438; G05D 1/0088
(Continued)

(56) References Cited

U.S. PATENT DOCUMENTS

| | | | |
|---|---|---|---|
| 6,359,570 B1 | 3/2002 | Adcox et al. | |
| 7,103,614 B1 | 9/2006 | Kucik | |

(Continued)

OTHER PUBLICATIONS

"U.S. Appl. No. 15/930,574, Examiner Interview Summary mailed Nov. 28, 2022", 2 pgs.
(Continued)

*Primary Examiner* — Tuan C To
*Assistant Examiner* — Dominick Mulder
(74) *Attorney, Agent, or Firm* — Schwegman Lundberg & Woessner, P.A.

(57)          ABSTRACT

In one aspect, a system for automatically assigning vehicle identifiers for autonomous vehicles can include a registry server computing system configured to perform operations. The operations can include receiving, at the registry server computing system and from a vehicle computing system onboard an autonomous vehicle, data describing the autonomous vehicle and generating, at the registry server computing system, a vehicle identifier for the autonomous vehicle based on the data describing the autonomous vehicle. The vehicle identifier can be different than and distinct from the data describing the autonomous vehicle. The operations can include associating, at the registry server computing system, the data describing the autonomous vehicle with the vehicle identifier for the autonomous vehicle in a vehicle registry. The vehicle registry can include respective vehicle identifiers associated with a plurality of autonomous vehicles.

20 Claims, 10 Drawing Sheets

Related U.S. Application Data

(60) Provisional application No. 63/002,645, filed on Mar. 31, 2020.

(51) Int. Cl.
_G08G 1/00_ (2006.01)
_G05D 1/00_ (2006.01)

(58) Field of Classification Search
USPC ........................................................ 701/31.4
See application file for complete search history.

(56) References Cited

U.S. PATENT DOCUMENTS

| | | | | |
|---|---|---|---|---|
| 9,329,049 | B2 | 5/2016 | Edwards et al. | |
| 9,711,047 | B1 * | 7/2017 | Knas .................... | G08G 1/143 |
| 10,666,767 | B1 * | 5/2020 | Floyd .................... | H04W 12/06 |
| 10,726,644 | B2 | 7/2020 | Abari et al. | |
| 11,349,669 | B1 * | 5/2022 | Floyd .................... | H04L 9/3242 |
| 11,694,546 | B2 | 7/2023 | Small et al. | |
| 2003/0200227 | A1 | 10/2003 | Ressler | |
| 2005/0088320 | A1 | 4/2005 | Kovach | |
| 2008/0238719 | A1 | 10/2008 | Marchasin et al. | |
| 2009/0024309 | A1 | 1/2009 | Crucs | |
| 2009/0026254 | A1 | 1/2009 | Johnson et al. | |
| 2009/0235326 | A1 | 9/2009 | Cho et al. | |
| 2012/0056725 | A1 | 3/2012 | Muriana | |
| 2013/0033386 | A1 | 2/2013 | Zlojutro | |
| 2015/0262221 | A1 | 9/2015 | Nakano et al. | |
| 2016/0035148 | A1 * | 2/2016 | Huang ................. | H04L 9/0866 |
| | | | | 701/31.4 |
| 2016/0320194 | A1 * | 11/2016 | Liu .................... | G01C 21/3438 |
| 2017/0294118 | A1 | 10/2017 | Chen et al. | |
| 2017/0344928 | A1 | 11/2017 | Shimura | |
| 2017/0353879 | A1 * | 12/2017 | Rad ........................ | H04L 43/08 |
| 2018/0211541 | A1 | 7/2018 | Rakah et al. | |
| 2018/0322775 | A1 * | 11/2018 | Chase .................... | G06F 15/76 |
| 2019/0025817 | A1 * | 1/2019 | Mattingly ............. | H04L 9/3239 |
| 2019/0086221 | A1 * | 3/2019 | Thiyagarajan ...... | G01C 21/3423 |
| 2019/0149324 | A1 * | 5/2019 | Kong .................... | H04L 9/0819 |
| | | | | 713/171 |
| 2019/0354114 | A1 | 11/2019 | Goldman et al. | |
| 2020/0005559 | A1 * | 1/2020 | Grunbok ................ | G06Q 50/40 |
| 2020/0023812 | A1 * | 1/2020 | Hassani ................ | H04L 67/306 |
| 2020/0133306 | A1 | 4/2020 | Chadha et al. | |
| 2020/0168088 | A1 | 5/2020 | Goluguri | |
| 2020/0218729 | A1 * | 7/2020 | Ryu ........................ | G06F 16/29 |
| 2020/0241869 | A1 | 7/2020 | Niemiec et al. | |
| 2020/0312154 | A1 * | 10/2020 | Mondello ................ | G05D 1/69 |
| 2020/0336541 | A1 * | 10/2020 | Naderi Alizadeh ..... | H04L 67/01 |
| 2020/0394905 | A1 * | 12/2020 | Bernhardt ............... | H04L 63/04 |
| 2020/0406933 | A1 | 12/2020 | Ide et al. | |
| 2021/0020037 | A1 * | 1/2021 | Awad Alla ............. | G08G 1/017 |
| 2021/0027334 | A1 | 1/2021 | Suthar et al. | |
| 2021/0123752 | A1 | 4/2021 | Rolf et al. | |
| 2021/0304591 | A1 | 9/2021 | Small et al. | |
| 2022/0114845 | A1 * | 4/2022 | Ryu .................... | G06F 21/6245 |
| 2022/0294863 | A1 * | 9/2022 | Floyd .................... | H04W 12/30 |
| 2022/0345886 | A1 * | 10/2022 | Schubert ............... | H04L 9/3239 |
| 2023/0098006 | A1 * | 3/2023 | Park ........................ | G07C 5/008 |
| | | | | 726/28 |

OTHER PUBLICATIONS

"U.S. Appl. No. 15/930,574, Final Office Action mailed Sep. 20, 2022", 8 pgs.

"U.S. Appl. No. 15/930,574, Non Final Office Action mailed Mar. 30, 2022", 31 pgs.

"U.S. Appl. No. 15/930,574, Notice of Allowance mailed Feb. 23, 2023", 12 pgs.

"U.S. Appl. No. 15/930,574, Response filed Jun. 30, 2022 to Non Final Office Action mailed Mar. 30, 2022", 14 pgs.

"U.S. Appl. No. 15/930,574, Response filed Dec. 16, 2022 to Final Office Action mailed Sep. 20, 2022", 14 pgs.

\* cited by examiner

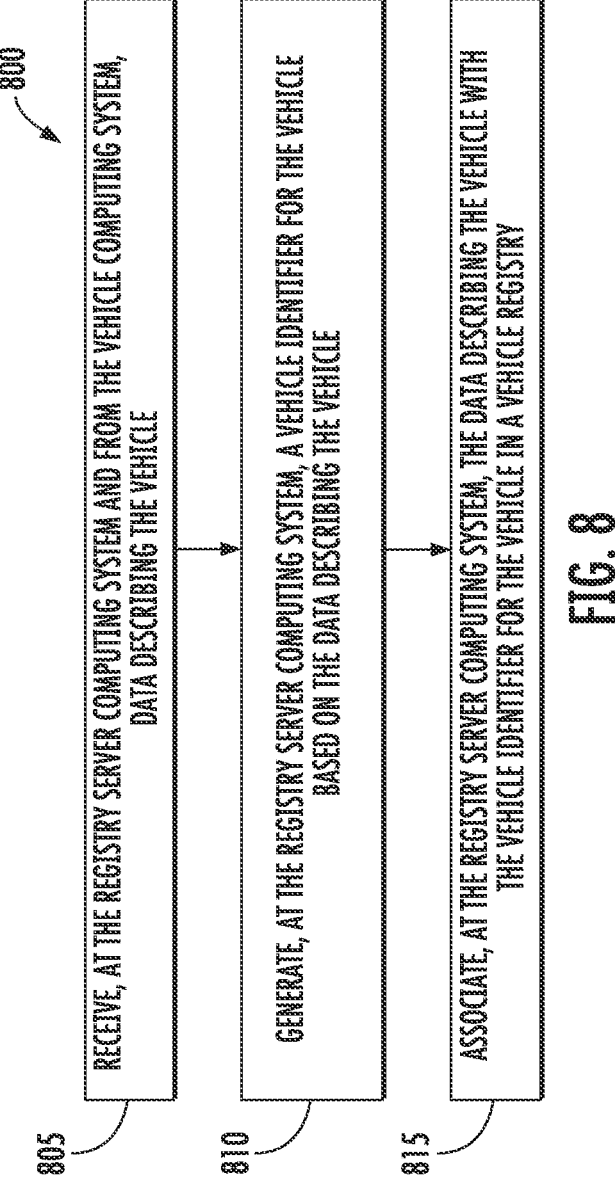

800

805   RECEIVE, AT THE REGISTRY SERVER COMPUTING SYSTEM AND FROM THE VEHICLE COMPUTING SYSTEM, DATA DESCRIBING THE VEHICLE

810   GENERATE, AT THE REGISTRY SERVER COMPUTING SYSTEM, A VEHICLE IDENTIFIER FOR THE VEHICLE BASED ON THE DATA DESCRIBING THE VEHICLE

815   ASSOCIATE, AT THE REGISTRY SERVER COMPUTING SYSTEM, THE DATA DESCRIBING THE VEHICLE WITH THE VEHICLE IDENTIFIER FOR THE VEHICLE IN A VEHICLE REGISTRY

FIG. 8

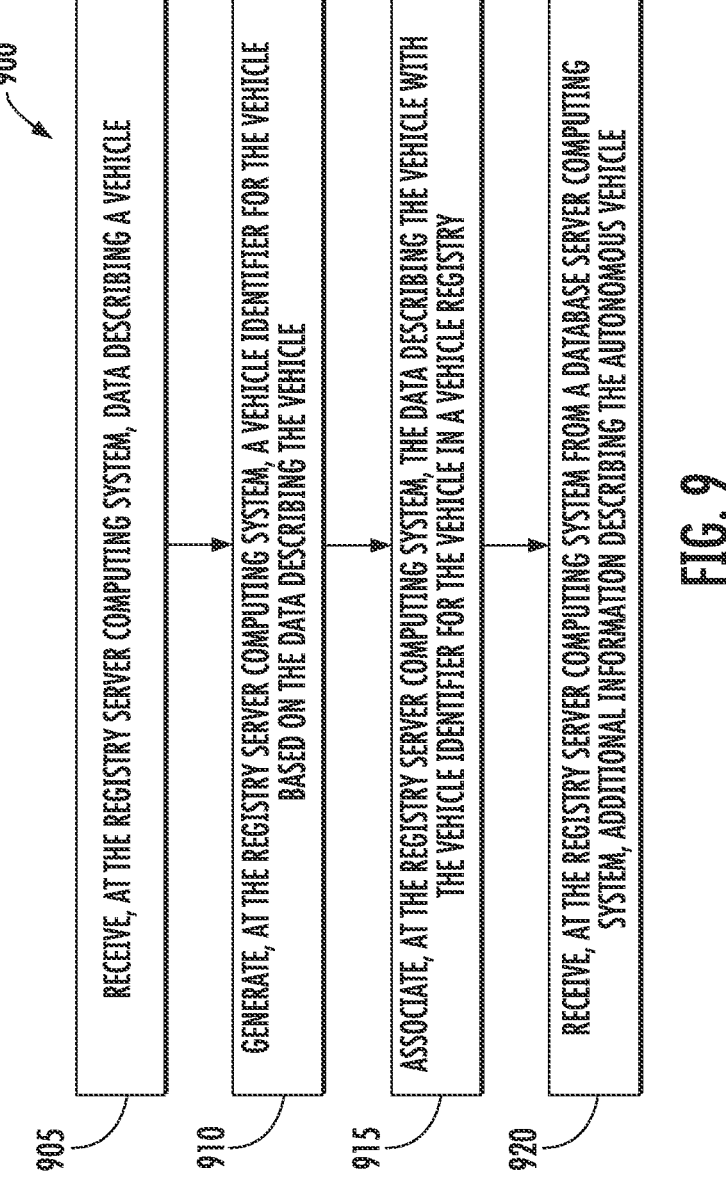

900

905 — RECEIVE, AT THE REGISTRY SERVER COMPUTING SYSTEM, DATA DESCRIBING A VEHICLE

910 — GENERATE, AT THE REGISTRY SERVER COMPUTING SYSTEM, A VEHICLE IDENTIFIER FOR THE VEHICLE BASED ON THE DATA DESCRIBING THE VEHICLE

915 — ASSOCIATE, AT THE REGISTRY SERVER COMPUTING SYSTEM, THE DATA DESCRIBING THE VEHICLE WITH THE VEHICLE IDENTIFIER FOR THE VEHICLE IN A VEHICLE REGISTRY

920 — RECEIVE, AT THE REGISTRY SERVER COMPUTING SYSTEM FROM A DATABASE SERVER COMPUTING SYSTEM, ADDITIONAL INFORMATION DESCRIBING THE AUTONOMOUS VEHICLE

FIG. 9

SYSTEMS AND METHODS FOR AUTOMATICALLY ASSIGNING VEHICLE IDENTIFIERS FOR VEHICLES

CROSS-REFERENCE TO RELATED APPLICATION

The present application is a continuation of U.S. application Ser. No. 15/930,574, filed May 13, 2020, which claims filing benefit of U.S. Provisional Patent Application Ser. No. 63/002,645 having a filing date of Mar. 31, 2020, each of which is incorporated herein by reference in its entirety.

FIELD

The present disclosure relates generally to vehicle networks for autonomous vehicles. More particularly, the present disclosure relates to systems and methods for automatically assigning vehicle identifiers for vehicles.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or can be learned from the description, or can be learned through practice of the embodiments.

Aspects of the present disclosure are directed to a system for automatically assigning vehicle identifiers for autonomous vehicles. The system can include a registry server computing system including one or more processors and one or more non-transitory computer-readable media that collectively store instructions that, when executed by the one or more processors, cause the registry server computing system to perform operations. The operations can include receiving, at the registry server computing system and from a vehicle computing system onboard an autonomous vehicle, data describing the autonomous vehicle. The operations can include generating, at the registry server computing system, a vehicle identifier for the autonomous vehicle based on the data describing the autonomous vehicle. The vehicle identifier can be different than and distinct from the data describing the autonomous vehicle. The operations can include associating, at the registry server computing system, the data describing the autonomous vehicle with the vehicle identifier for the autonomous vehicle in a vehicle registry. The vehicle registry can include respective vehicle identifiers associated with a plurality of autonomous vehicles.

Another aspect of the present disclosure is directed to a method for automatically assigning vehicle identifiers for autonomous vehicles. The method can include receiving, at a registry server computing system including one or more computing devices and from a vehicle computing system onboard an autonomous vehicle, data describing the autonomous vehicle. The method can include generating, at the registry server computing system, a vehicle identifier for the autonomous vehicle based on the data describing the autonomous vehicle. The vehicle identifier can be different than and distinct from the data describing the autonomous vehicle. The method can include associating, at the registry server computing system, the data describing the autonomous vehicle with the vehicle identifier for the autonomous vehicle in a vehicle registry.

Another aspect of the present disclosure is directed to a system for automatically assigning vehicle identifiers for autonomous vehicles. The system can include a registry server computing system including one or more computing devices, one or more processors, and one or more non-transitory computer-readable media that collectively store instructions that, when executed by the one or more processors, cause the system to perform operations. The operations can include receiving, at the registry server computing system, data describing an autonomous vehicle and generating, at the registry server computing system, a vehicle identifier for the autonomous vehicle based on the data describing the autonomous vehicle. The vehicle identifier can be different than and distinct from the data describing the autonomous vehicle. The operations can include associating, at the registry server computing system, the data describing the autonomous vehicle with the vehicle identifier for the autonomous vehicle in a vehicle registry. The operations can include receiving, at the registry server computing system from a database server computing system, additional information describing the autonomous vehicle.

Other aspects of the present disclosure are directed to various systems, apparatuses, non-transitory computer-readable media, user interfaces, and electronic devices.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 8 depicts an example flow diagram of an example method for automatically assigning vehicle identifiers for autonomous vehicles according to example implementations of the present disclosure.

FIG. 9 depicts an example flow diagram of an example method 900 for automatically assigning vehicle identifiers for autonomous vehicles according to example implementations of the present disclosure.

DETAILED DESCRIPTION

Figure 1:
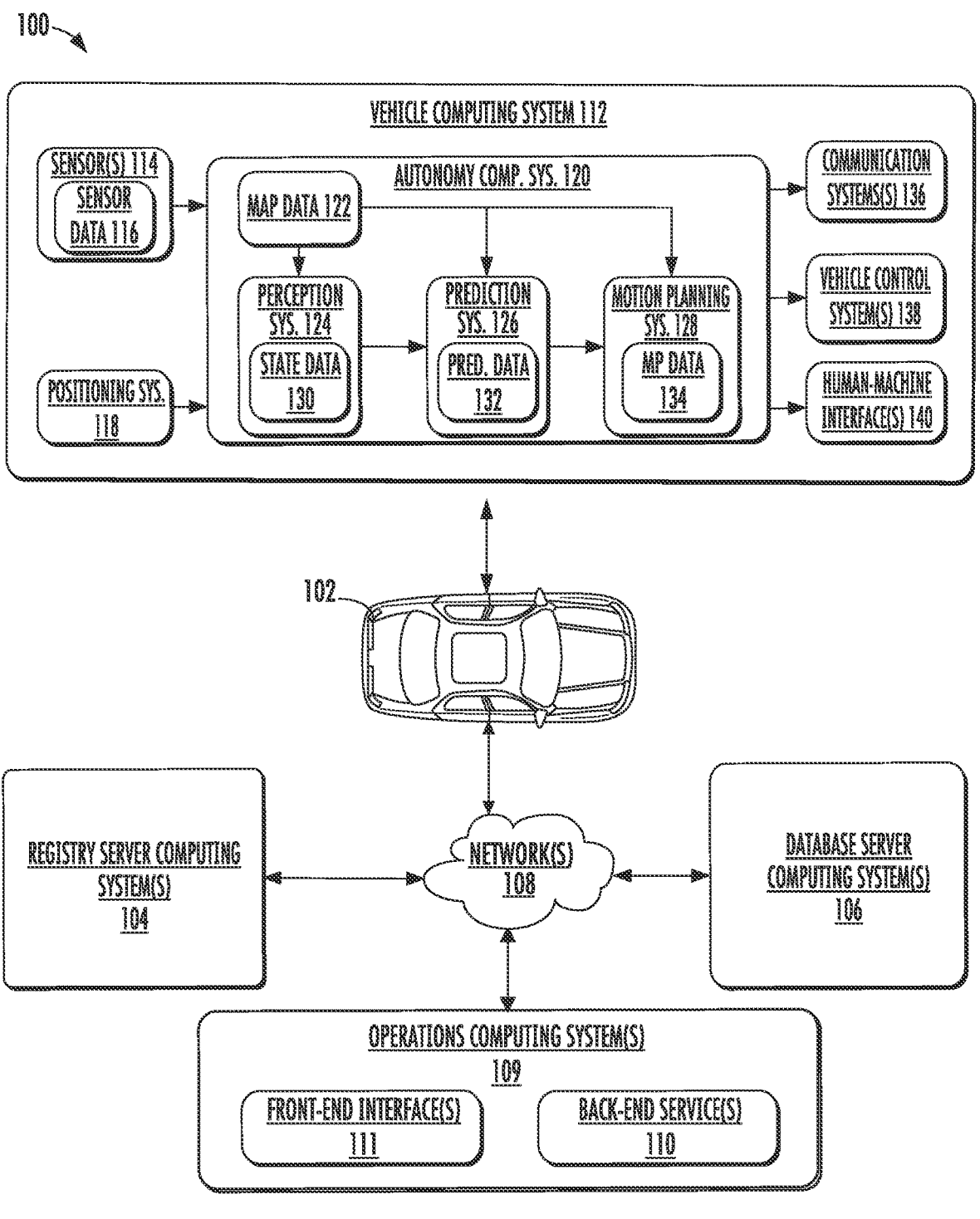
FIG. 1 depicts an example system overview according to example implementations of the present disclosure.

Generally, the present disclosure is directed to systems and methods for automatically assigning vehicle identifiers for vehicles (e.g., in a vehicle network), which can improve functionality and security of a service entity's infrastructure. For example, assigning and using vehicle identifiers as described herein can increase the service entity's ability to securely monitor and/or communicate with a fleet of vehicles (e.g., autonomous vehicles). For instance, the vehicle identifiers can be used to coordinate between various databases for the purposes of tracking the vehicles' software updates, geographic positioning and/or distribution assignments, scheduling maintenance, and the like. As another example, the systems described herein can better coordinate and optimize the utilization of the vehicle fleet while one or more of the vehicles are offline. For instance, assigning and using vehicle identifiers as described herein can avoid the need for a new vehicle identifier to be generated each time the vehicle (e.g., onboard vehicle computing system) is powered on. Thus, the systems and methods provided herein can provide a variety of benefits, including improved functionality, security, and efficiency.

More specifically, when a vehicle, such as autonomous vehicle, is powered on, computing systems aboard the autonomous vehicle can establish connection with one or more registry server computing systems. The registry server computing systems can communicate with the computing systems aboard the autonomous vehicle for a variety of purposes, including tracking the vehicle, controlling aspects of the vehicle's operation, and the like. Such communications can benefit from a vehicle registry in which the vehicle is assigned a unique vehicle identifier. A respective unique vehicle identifier can be assigned to the vehicle for organizing and facilitating effective communication and/or record keeping with respect to the vehicle (e.g., to facilitate cross-referencing and/or consolidation of data for the vehicle respect to a plurality of databases). The registry server computing system(s) can control and implement such assignment of unique vehicle identifiers for a plurality of vehicles (e.g., an autonomous vehicle fleet). Thus, server-based assignment of vehicle identifiers according to aspects of the present disclosure can improve security and/or accuracy for communication with vehicle computing systems (e.g., in an autonomous vehicle fleet).

More specifically, in some embodiments, a system for automatically assigning vehicle identifiers for vehicles in a vehicle network can include a registry server computing system including one or more computing devices and a vehicle computing system including one or more computing devices. The vehicle computing system can be physically located onboard a vehicle (e.g., an autonomous vehicle). The system can be configured to receiving data describing the vehicle at the registry server computing system and from the vehicle computing system. For example, the data describing the vehicle can include a vehicle identification number (VIN), a vehicle alias, or any other suitable data describing the vehicle. A vehicle alias can be or include an identifier assigned to the vehicle by the operator of a rideshare service or any other suitable unique name, label, or other data that can be used to identify the vehicle. For example, this data describing the vehicle can be automatically sent in a variety of circumstances, such as when the vehicle is first powered on and/or periodically throughout normal operation. The operations can include generating, at the registry server computing system, a vehicle identifier for the vehicle based on the data describing the vehicle. The vehicle identifier can be different than and distinct from the data describing the vehicle. As examples, the vehicle identifier can be or include a number, text, or an alpha-numeric string distinct from the data describing the vehicle. The operations can include associating, at the registry server computing system, the data that describes the vehicle (e.g., VIN number, vehicle alias, etc.) with the vehicle identifier for the vehicle in a vehicle registry (e.g., table, list, tree, other data structure stored within a database, etc.), which can be maintained at the registry server computing system. The registry server computing system can assign the vehicle identifier to the vehicle. The vehicle identifier can subsequently be used to route communication to and from the vehicle, to track the vehicle, and/or maintain a log of information about the vehicle. Thus, the registry server computing system can control and/or facilitate communications with vehicle(s) and/or cross-reference between one or more databases with respect to the vehicle(s).

As described herein, the vehicles associated with the registry server can include autonomous vehicles. An autonomous vehicle can be a ground-based autonomous vehicle (e.g., car, truck, bus, bike, scooter, etc.) or another type of vehicle (e.g., aerial vehicle, etc.) that can operate with minimal and/or no interaction from a human operator. An autonomous vehicle can include a vehicle computing system located onboard the autonomous vehicle to help control the autonomous vehicle. The vehicle computing system can be located onboard the autonomous vehicle, in that the vehicle computing system can be located on or within the autonomous vehicle. The vehicle computing system can include one or more sensors, an autonomy computing system (e.g., for determining autonomous navigation), one or more vehicle control systems (e.g., for controlling braking, steering, powertrain, etc.), and/or other systems. The vehicle computing system can obtain sensor data from sensor(s) onboard the vehicle, attempt to comprehend the vehicle's surrounding environment by performing various processing techniques on the sensor data, and generate an appropriate motion plan through the vehicle's surrounding environment.

The vehicle computing system can receive sensor data from one or more sensors that are coupled to or otherwise included within the autonomous vehicle. For example, in some implementations, a perception system can be included within the vehicle computing system and configured to receive the sensor data. As examples, the one or more sensors can include a Light Detection and Ranging (LIDAR) system, a Radio Detection and Ranging (RADAR) system, one or more cameras (e.g., visible spectrum cameras, infrared cameras, etc.), a positioning system (e.g., GPS), and/or other sensors. The sensor data can include information that describes the location of static objects and/or dynamic objects (actors) within the surrounding environment of the autonomous vehicle. For example, the objects can include traffic signals, additional vehicles, pedestrians, bicyclists, signs (e.g., stop signs, yield signs), and/or other objects. The sensor data can include raw sensor data and/or data that has been processed or manipulated in some manner before being provided to other systems within the autonomy computing system.

In addition to the sensor data, the vehicle computing system can retrieve or otherwise obtain map data that provides detailed information about the surrounding environment of the autonomous vehicle. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, and/or instructions of signage (e.g., stop signs, yield signs), traffic lights (e.g., stop lights), or other traffic signals or control devices/markings (e.g., cross walks)); and/or any other map data that provides information that assists the vehicle computing system in comprehending and perceiving its surrounding environment and its relationship thereto.

Autonomous vehicles can be utilized by the service entity to provide vehicle services can be associated with a fleet of the service entity or a third party. For example, the service entity may own, lease, etc. a fleet of autonomous vehicles that can be managed by the service entity (e.g., its backend system clients) to provide one or more vehicle services. An autonomous vehicle utilized to provide the vehicle service(s) can be included in this fleet of the service entity. Such autonomous vehicle may be referred to as "service entity autonomous vehicles" or "first party autonomous vehicles." In some implementations, an autonomous vehicle can be associated with a third party vehicle provider such as, for example, an individual, an original equipment manufacturer (OEM), a third party vendor, or another entity. These autonomous vehicles may be referred to as "third party autonomous vehicles." Even though such an autonomous vehicle may not be included in the fleet of autonomous vehicles of the service entity, the service platform can allow the autonomous vehicle(s) associated with a third party to still be utilized to provide the vehicle services offered by the service entity, access the service entity's system back-ends systems, etc.

The service entity can utilize an operations computing system that provides a service infrastructure for monitoring, supporting, and maintaining the autonomous vehicles as well as for coordinating and managing the autonomous vehicles to provide vehicle services. For instance, the operations computing system can include a service platform. The service platform can include a plurality of back-end services and front-end interfaces, which are accessible via one or more APIs. For example, an autonomous vehicle and/or another computing system (that is remote from the autonomous vehicle) can communicate/access the service platform (and its backend services) by calling the one or more APIs. The service platform can include a plurality of back-end services such as, for example, a vehicle service assignment deployment service, a routing service, a remote assistance service, etc. These back-end service(s) can help coordinate and manage autonomous vehicles (e.g., a fleet associated with the service entity) to provide vehicle services to users. The vehicle services can include, for example, user transportation services (e.g., by which the vehicle transports user(s) from one location to another), delivery services (e.g., by which a vehicle delivers item(s) to a requested destination location), courier services (e.g., by which a vehicle retrieves item(s) from a requested origin location and delivers the item to a requested destination location), and/or other types of services.

Aspects of the present disclosure can be used to automatically assign vehicle identifiers to autonomous vehicles, for example of a fleet of vehicles. Vehicle networks that interface fleets of autonomous vehicles can be required to access multiple servers and/or databases. Each database can assign a respective identifier to a given vehicle and/or the vehicle can generate an identifier for itself. Reconciling and/or cross-referencing data between the various servers and/or databases can be difficult to achieve using such identifiers, which can hinder the ability to monitor and/or communicate with the vehicles. Aspects of the system and method described herein can address one or more of these issues.

For example, assigning and using vehicle identifiers as described herein can increase the service entity's ability to securely monitor and/or communicate with a fleet of vehicles (e.g., autonomous vehicles). Each autonomous vehicle can send data to the registry server, which can generate a respective vehicle identifier for the autonomous using the data. As indicated above, the data can describe and/or identify the respective autonomous vehicle, such as VIN, a vehicle alias, or any other suitable data describing the autonomous vehicle. The autonomous vehicle(s) can send such data at a variety of times and in a variety of circumstances. As example, the autonomous vehicle(s) can send such data when the vehicle is first powered on and/or periodically throughout normal operation of the autonomous vehicle.

In some embodiments, the registry server computing system(s) can be configured to perform a hash function with respect to the data that describes the vehicle and/or other data to generate the vehicle identifier. For example, hashing can be formed for the vehicle alias, VIN number, or the like (e.g., with each other and/or with other data to generate the vehicle identifier). As one example, hashing can be performed with the vehicle alias and the VIN number. As a further example, hashing can be performed with the vehicle alias and data associated with the vehicle computing system (e.g., software version, hardware identifiers, and the like).

One of ordinary skill in the art would understand that a variety of other configurations are possible within the scope of this disclosure.

Additionally, vehicles may provide status data that describes a status of the vehicle to remote servers at a variety of times and in response to a variety of circumstances and/or events. For example, the status data can describe a change in status of an autonomous vehicle and/or reporting of an event with respect to the autonomous vehicle. As examples, the status data can describe events and/or status changes of the autonomous vehicle as part of a service (e.g., rideshare service), such as include picking up user(s), dropping off user(s), picking up item(s), dropping off item(s), and/or other status changes. As additional examples, the status data can indicate or describe the autonomous vehicle having a mechanical issue (e.g., flat tire, air conditioning malfunction, or the like), becoming delayed (e.g., by traffic). Additionally, in some embodiments, the autonomous vehicle can periodically provide status data that describes a location of the autonomous vehicle. Such data transmissions and/or messages can include and/or be identified by the vehicle identifier.

In some embodiments, the vehicle identifier can be used to route communications with respect to multiple server devices. For example, the vehicle identifier can be shared with the multiple server devices. Communications for a given vehicle can be routed through the multiple server devices based on the vehicle identifier to ensure that the routes for such communications are effective, known, and/or not duplicative. For example, the vehicle identifier can be used to ensure that communications for a given vehicle are transmitted through the same server or combination of servers over a period of time (e.g., based on the location of the vehicle, for a single operating session of the vehicle, and the like).

In an example embodiment, the registry server computing system(s) can distribute the vehicle identifier with other systems and/or devices. As an example, the registry server computing system(s) can transmit to the vehicle computing system and/or database server computing systems. In some embodiments, the system can be configured to facilitate communication with one or more database server computing systems, which can maintain respective databases of information (e.g., metadata) for the vehicle(s). The system (e.g., registry server computing system) can correlate information and/or facilitate updates between the various databases using the vehicle identifier. For example, the registry server computing system that generates the vehicle identifier can be configured to control and/or monitor autonomous operations of the vehicle. The database server computing system(s) can maintain respective databases with respect to additional information (e.g., metadata) about the vehicle, such as vehicle service information (e.g., miles until next oil change, miles until new tires needed, etc.) and/or vehicle configuration (e.g., make, model, sensor type, software version, etc.). The system can aid in correlating such disparate databases through use of the vehicle identifier.

In some embodiments, the system can associate various other identifiers for the vehicle with the vehicle identifier in the register to facilitate cross-referencing between various different databases of information. For example, the additional information describing the vehicle that is received from the database server computing system can include a respective database ID for the vehicle associated with the database server computing system. The database ID for the vehicle can be or include a handle or label by which the database server computing system identifies information pertaining to the vehicle. The system can associate multiple different database IDS for the vehicle from a plurality of databases such that data for the vehicle can be cross-referenced across the plurality of databases. Thus, the system can facilitate cross referencing between various databases of information.

By utilizing the systems and methods described herein, a service entity can improve the ability for its infrastructure to communicate with and coordinate assignments for its fleet of vehicles (e.g., autonomous vehicles). For example, the registry server computing system can communicate with a vehicle service assignment deployment back-end service of the service platform. The deployment back-end service can obtain vehicle identifier(s) from the registry server computing system and determine which of the vehicles (e.g., autonomous vehicles) are or will become available to provide vehicle services. Such determination can be made by comparing the vehicle identifier(s) from the registry server computing system with messages from the vehicles that are online with the service platform. The deployment back-end service can record any vehicle service assignments with the vehicle identifier to track which vehicles are currently assigned a vehicle service, projected to be assigned a vehicle service, may be finishing a vehicle service assignment, or not assigned a vehicle service assignment/available to do so.

The vehicle service assignment can be associated with a single or multiple mode itinerary. For example, a user can request transportation of the user from an origin location to a destination location. The deployment back-end service can determine that a vehicle is available to provide the vehicle service for the user based at least in part on the vehicle identifier, which can be stored with a current status of the vehicle. The deployment back-end service can determine that the vehicle is capable of transporting the user from the origin location to the destination location by using the vehicle identifier to retrieve the vehicles current location and operational capabilities (e.g., autonomy capabilities) from one or more databases and/or other services. The deployment back-end service can create an itinerary for the vehicle that includes data indicative of the origin/destination locations, a route for the vehicle, timing information (e.g., pick-up/drop-off time(s), etc.), user information (e.g., preferences, accommodates, etc.), and/or other information. The deployment back-end service can assign the itinerary to the vehicle by storing the vehicle identifier with data indicative of the itinerary, user, etc. and communicating data indicative of the itinerary to the vehicle. The deployment back-end service can utilize the vehicle identifier when communicating data to the vehicle to ensure that it is routed properly and/or can utilize the vehicle identifier when obtaining data from the vehicle to ensure the itinerary is monitored in real-time (e.g., as the itinerary state changes from picking-up the user, travelling to the destination location, dropping-off the user, etc.).

In some implementations, the vehicle identifier can be utilized to help generate a multi-modal itinerary for the user. For example, a multi-modal transportation service can include travel by ground autonomous vehicle, travel by aircraft, and other suitable transportation modes (e.g., bus, boat (e.g., ferry), train, etc.). The various modalities can be provided by one or more service providers or service provider systems. For example, a first service provider computing device can provide and/or arrange a first transportation modality, a second service provider computing device can provide and/or arrange a second transportation modality, an Nth service provider computing device can provide and/or arrange an Nth transportation modality, and so forth.

The service platform can facilitate and select a multi-modal transportation service based on a variety of factors. One example factor includes the types of transportation modalities that are required, practical, and/or efficient to reach the destination, for example due to the autonomous capabilities of available vehicles, inaccessibility or impracticality of transport via particular transportation modalities. For instance, a land route over a bridge may take substantially longer than taking a ferry or air transportation over an intervening body of water. As another example factor, a user's preference or explicit selection of a specific transportation modality can be considered when facilitating a multi-model transport. For instance, a user can explicitly select or generally prefer an aerial transport, public transport, or another transportation modality. In such an instance, the platform can facilitate a multi-modal transportation service according to the user's preference or request. In the above examples, the service platform can facilitate such multi-modal trips using the various respective vehicle identifiers of the vehicles (e.g., self-driving car, autonomous aircraft, etc.) to the one or more legs of the itinerary that are provided by the service platform.

In some embodiments, the vehicle identifier can be utilized by a routing back-end service to help improve the monitoring and coordination of vehicle routing. For example, the routing back-end service of the service platform can utilize the vehicle identifier to obtain (e.g., via request, pull, etc.) data indicative of the software versions of the associated vehicle. The software versions can indicate, for example, whether an autonomous vehicle has the most recent autonomy software versions. This can help determine the best route for an autonomous vehicle to traverse while providing a vehicle service.

Additionally, or alternatively, the vehicle identifier can help improve the ability of the routing back-end service to assign, coordinate, monitor, adjust, etc. the user of one or more designated pick-up and/or drop-off zones. For example, the service entity can be associated with one or more designated pick-up and/or drop-off zones that can be utilized for its fleet of vehicles. These zones can be designated areas on and/or near a travel way or parking area where the vehicle can stop, park, pull-over, etc. The routing back-end service (and/or another service) can utilize the vehicle identifiers of the vehicles to track which zones are being or are to be occupied by a vehicle, which zones are available, etc. by associated the vehicle identifier with data indicative of the zone in a database.

In some implementations, the vehicle identifier described herein can improve the offline functionalities of the service entity's infrastructure. For instance, as described herein, the system and methods of the present disclosure help avoid the need for a vehicle identifier to be created each time the vehicle (e.g., onboard vehicle computing system) is booted. This can allow the service platform to coordinate and optimize the utilization of the service entity's vehicle fleet while one or more of the vehicles are offline. For example, the vehicle identifier can be stored with data indicating the location of the vehicle while the vehicle is offline (e.g., a storage area, parking area, service depot, etc.). The vehicle identifier can also be stored with information describing an offline time duration associated with a vehicle. The offline time duration can indicate how long the vehicle may be offline due, for example, to maintenance, computing updates, refueling, data downloading, etc. A routing back-end service (or another service associated with supply positioning) can determine that it would be favorable to position one or more vehicles in a certain area before the vehicles go back online and become available to undertake vehicle service assignments. Based at least in part on the vehicle identifier (and its association with the vehicle location, offline time duration, etc.), the back-end service can utilize the vehicle identifier to determine which vehicle(s) can be re-positioned from their current locations to these certain areas in the most efficient manner, before those vehicles go online with the service platform. Additionally, or alternatively, the back-end service can determine whether the vehicle is in the appropriate location (e.g., service depot) and has enough time to receive a software update while the vehicle is offline based at least in part on the vehicle identifier (and its association with the vehicle location, offline time duration, etc.). This can depend on whether the service depot has the hardware and/or communicability infrastructure to facilitate such a software updating process. In this way, the systems and methods described herein can generate a vehicle identifier that improves the efficiency of the service entity infrastructures offline functionalities.

The system can provide various security benefits, for example with respect to vehicle identifiers that have been compromised and/or used in an unauthorized manner. For instance, a vehicle identifier that is nefariously used to impersonate a vehicle (e.g., in a fleet of autonomous vehicles) can pose as a safety and security risk for operations of the other vehicles (e.g., fleet of autonomous vehicles). Detecting and reacting to such unauthorized uses of vehicle identifiers can improve safety and security. While a platform for coordinating and managing a fleet of autonomous vehicle can include other preventive measures, such detection and reaction can be further facilitated by the server-based generation of the vehicle identifiers described herein.

For example, in one embodiment, the system can detect an unauthorized use of the vehicle identifier and generate a new vehicle identifier for the vehicle in response to detecting the unauthorized use of the vehicle identifier. The new vehicle identifier can be associated with the vehicle in the registry. The old vehicle identifier can be disassociated with the vehicle and/or flagged as compromised. As a result, use of compromised vehicle identifier (e.g., by a third parties for a nefarious purpose) can be curtailed, identified, and/or isolated. For instance, the registry server computing system can notify database server computing system(s) of compromised vehicle identifiers. Subsequent communications received with reference to such compromised vehicle identifiers can be identified as unauthorized and/or disregarded. Thus, the system can provide security advantages by detecting and/or preventing unauthorized use of vehicle identifiers.

The system can generate and assign new vehicle identifiers in a variety of other circumstances as well. For example, in some embodiments, a new vehicle identifier can be generated and assigned each time a given vehicle is powered on, has a software update, and/or has a physical hardware update. Thus, a frequency at which the server computing system updates the vehicle identifiers can vary in some embodiments.

Example aspects of the present disclosure can provide for a number of technical effects and benefits, including improvements to computing systems. For example, the computational time and resources required to track vehicles and update vehicle databases can be reduced by pushing data from databases to the registry server computing system with use of the vehicle identifier, as described herein. Another example technical effect and benefit can include improved safety and security. For example, compromised vehicle identifiers can be used nefariously to impersonate a vehicle (e.g., in a fleet of autonomous vehicles) and thus can pose risks to safe operations of the vehicle(s) (e.g., fleet of autonomous vehicles). Central and/or server-based generation of the vehicle identifiers, as described herein, can aid with detecting and reacting to unauthorized uses of vehicle identifiers. For example, the system can generate a new vehicle identifier in response to detecting unauthorized use of a current vehicle identifier. The compromised vehicle identifier can be disassociated with the vehicle and/or flagged as compromised. Thus, unauthorized use of compromised vehicle identifiers (e.g., by a third parties for a nefarious purpose) can be curtailed, identified, and/or addressed. Thus, the system can provide security advantages by detecting and/or preventing unauthorized use of vehicle identifiers.

Various means can be configured to perform the methods and processes described herein. For example, a computing system can include gateway server unit(s), vehicle provisioning unit(s), database server unit(s), registry server unit(s), vehicle computing unit(s), remote debugging unit(s) and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to receive, at the registry server computing system and from the vehicle computing system, data describing the vehicle. The registry server unit(s), vehicle computing unit(s), and/or gateway server unit(s) are example means for receiving data describing the vehicle at the registry server computing system from the vehicle computing system.

The means can be configured to generate, at the registry server computing system, a vehicle identifier for the vehicle based on the data describing the vehicle. The vehicle identifier can be different than and distinct from the data describing the vehicle. For example, a hash function can be performed with respect a vehicle alias, VIN number, and/or other data (software version, hardware identifiers, and the like). The registry server unit(s) is an example means for generating, at the registry server computing system, the vehicle identifier for the vehicle based on the data describing the vehicle system.

The means can be configured to associate, at the registry server computing system, the data describing the vehicle with the vehicle identifier for the vehicle in a vehicle registry. The registry server unit(s) is an example means for associating, at the registry server computing system, the data describing the vehicle with the vehicle identifier for the vehicle in a vehicle registry.

FIG. 1 depicts an example system 100 overview according to example implementations of the present disclosure. When a vehicle 102, such as autonomous vehicle, is powered on, the vehicle computing system 112 aboard the autonomous vehicle 102 can establish connection with the registry server computing system(s) 104. The registry server computing system(s) 104 can communicate with the vehicle computing systems 112 aboard the autonomous vehicle 102 for a variety of purposes, including tracking the vehicle 102, controlling aspects of the operation of the vehicle 102, and the like. Such communications can benefit from a vehicle registry in which the vehicle 102 is assigned a unique vehicle identifier. A respective unique vehicle identifier can be assigned to the vehicle 102 for organizing and facilitating effective communication and/or record keeping with respect to the vehicle 102 (e.g., to facilitate cross-referencing and/or consolidation of data for the vehicle respect to a plurality of databases). The registry server computing system(s) 104 can control and implement such assignment of unique vehicle identifiers for a plurality of vehicles 102 (e.g., an autonomous vehicle fleet). Thus, server-based assignment of vehicle identifiers according to aspects of the present disclosure can improve security and/or accuracy for communication with vehicle computing systems (e.g., in an autonomous vehicle fleet).

More specifically, in some embodiments, the system 100 for automatically assigning vehicle identifiers for vehicles 102 in a vehicle network can include one or more registry server computing systems 104 including one or more computing devices. The system 100 can include a vehicle computing system 112 including one or more computing devices. The vehicle computing system 112 can be physically located onboard a vehicle 102 (e.g., an autonomous vehicle). The system 100 can be configured to receiving data describing the vehicle 102 at the registry server computing system(s) 104 from the vehicle computing system 112. For example, the data describing the vehicle 102 can include a vehicle identification number (VIN), a vehicle alias, or any other suitable data describing the vehicle 102. A vehicle alias can be or include an identifier assigned to the vehicle 102 by the operator of a rideshare service or any other suitable unique name, label, or other data that can be used to identify the vehicle. For example, this data describing the vehicle 102 can be automatically sent in a variety of circumstances, such as when the vehicle 102 is powered on and/or periodically throughout normal operation. The operations can include generating, at the registry server computing system 104, a vehicle identifier for the vehicle 102 based on the data describing the vehicle 102. The vehicle identifier can be different than and distinct from the data describing the vehicle 102. As examples, the vehicle identifier can be or include a number, text, or an alpha-numeric string distinct from the data describing the vehicle 102. The operations can include associating, at the registry server computing system 104, the data (e.g., VIN number, vehicle alias, etc.) that describes the vehicle 102 with the vehicle identifier for the vehicle 102 in a vehicle registry (e.g., table, list, tree, other data structure stored within a database, etc.), which can be maintained at the registry server computing system(s) 104. The registry server computing system 104 can assign the vehicle identifier to the vehicle 102. The vehicle identifier can subsequently be used to route communication to and from the vehicle 102, to track the vehicle 102, and/or maintain a log of information about the vehicle 102. Thus, the registry server computing system 104 can control and/or facilitate communications with vehicle(s) 102 and/or cross-reference between one or more databases with respect to the vehicle(s) 102.

As described herein, the vehicles 102 associated with the registry server computing system 104 can include autonomous vehicles. The autonomous vehicle 102 can be a ground-based autonomous vehicle (e.g., car, truck, bus, bike, scooter, etc.) or another type of vehicle 102 (e.g., aerial vehicle, etc.) that can operate with minimal and/or no interaction from a human operator. An autonomous vehicle 102 can include the vehicle computing system 112 located onboard the autonomous vehicle 102 to help control the autonomous vehicle 102. The vehicle computing system 112 can be located onboard the autonomous vehicle 102, in that the vehicle computing system 112 can be located on or within the autonomous vehicle 102. The vehicle computing system 112 can include one or more sensors 114, an autonomy computing system 120 (e.g., for determining autonomous navigation), one or more vehicle control systems 138 (e.g., for controlling braking, steering, powertrain, etc.), and/or other systems. The vehicle computing system 112 can obtain sensor data 116 from sensor(s) 114 onboard the vehicle 102, attempt to comprehend the surrounding environment of the vehicle 102 by performing various processing techniques on the sensor data 116, and generate an appropriate motion plan through the surrounding environment of the vehicle 102.

The vehicle computing system 112 can receive sensor data 116 from one or more sensors 114 that are coupled to or otherwise included within the autonomous vehicle 102. For example, in some implementations, a perception system 124 can be included within the vehicle computing system 112 and configured to receive the sensor data 116. As examples, the one or more sensors 114 can include a Light Detection and Ranging (LIDAR) system, a Radio Detection and Ranging (RADAR) system, one or more cameras (e.g., visible spectrum cameras, infrared cameras, etc.), a positioning system (e.g., GPS), and/or other sensors. The sensor data 116 can include information that describes the location of static objects and/or dynamic objects (actors) within the surrounding environment of the autonomous vehicle 102. For example, the objects can include traffic signals, additional vehicles, pedestrians, bicyclists, signs (e.g., stop signs, yield signs), and/or other objects. The sensor data 116 can include raw sensor data and/or data that has been processed or manipulated in some manner before being provided to other systems within the autonomy computing system.

In addition to the sensor data 116, the vehicle computing system 112 can retrieve or otherwise obtain map data 122 that provides detailed information about the surrounding environment of the autonomous vehicle 102. The map data 122 can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, and/or instructions of signage (e.g., stop signs, yield signs), traffic lights (e.g., stop lights), or other traffic signals or control devices/markings (e.g., cross walks)); and/or any other map data 122 that provides information that assists the vehicle computing system 121 in comprehending and perceiving its surrounding environment and its relationship thereto.

Autonomous vehicles 102 can be utilized by the service entity to provide vehicle services can be associated with a fleet of the service entity or a third party. For example, the service entity may own, lease, etc. a fleet of autonomous vehicles 102 that can be managed by the service entity (e.g., its backend system clients) to provide one or more vehicle services. An autonomous vehicle 102 utilized to provide the vehicle service(s) can be included in this fleet of the service entity. Such autonomous vehicle 102 may be referred to as "service entity autonomous vehicles" or "first party autonomous vehicles." In some implementations, an autonomous vehicle 102 can be associated with a third party vehicle provider such as, for example, an individual, an original equipment manufacturer (OEM), a third party vendor, or another entity. These autonomous vehicles 102 may be referred to as "third party autonomous vehicles." Even though such an autonomous vehicle 102 may not be included in the fleet of autonomous vehicles 102 of the service entity, the service platform can allow the autonomous vehicle(s) 102 associated with a third party to still be utilized to provide the vehicle services offered by the service entity, access the service entity's system back-ends systems, etc.

The service entity can utilize an operations computing system 109 that provides a service infrastructure for monitoring, supporting, and maintaining the autonomous vehicles as well as for coordinating and managing the autonomous vehicles to provide vehicle services. For instance, the operations computing system 109 can include a service platform. In some embodiments, the operations computing system 109 can include one or both of the registry server computing system(s) 104 and the database server computing system(s) 106. The service platform (e.g., operations computing system(s) 109) can include a plurality of back-end services 110 and front-end interfaces 111, which are accessible via one or more APIs, for example as described below with reference to FIGS. 2 through 5. For example, an autonomous vehicle 102 and/or another computing system (that is remote from the autonomous vehicle 102) can communicate/access the service platform (and its backend services) by calling the one or more APIs, for example as described below with reference to FIGS. 2 through 5. The service platform can include a plurality of back-end services 110 such as, for example, a vehicle service assignment deployment service, a routing service, a remote assistance service, etc. These back-end service(s) 110 can help coordinate and manage autonomous vehicles (e.g., a fleet associated with the service entity) to provide vehicle services to users. The vehicle services can include, for example, user transportation services (e.g., by which the vehicle transports user(s) from one location to another), delivery services (e.g., by which a vehicle delivers item(s) to a requested destination location), courier services (e.g., by which a vehicle retrieves item(s) from a requested origin location and delivers the item to a requested destination location), and/or other types of services.

Aspects of the present disclosure can be used to automatically assign vehicle identifiers to autonomous vehicles 102, for example of a fleet of vehicles 102. Vehicle networks that interface fleets of autonomous vehicles 102 can be required to access multiple servers and/or databases. Each database can assign a respective identifier to a given vehicle 102 and/or the vehicle 102 can generate an identifier for itself. Reconciling and/or cross-referencing data between the various servers and/or databases (e.g., systems 104, 106, 108) can be difficult to achieve using such identifiers, which can hinder the ability to monitor and/or communicate with the vehicles. Aspects of the system and method described herein can address one or more of these issues.

For example, assigning and using vehicle identifiers as described herein can increase the service entity's ability to securely monitor and/or communicate with a fleet of vehicles 102 (e.g., autonomous vehicles 102). Each autonomous vehicle 102 can send data to the registry server computing system 104, which can generate a respective vehicle identifier for the autonomous vehicle 102 using the data. As indicated above, the data can describe and/or identify the respective autonomous vehicle, such as VIN, a vehicle alias, or any other suitable data describing the autonomous vehicle 102. The autonomous vehicle(s) 102 can send such data at a variety of times and in a variety of circumstances. As example, the autonomous vehicle(s) 102 can send such data when the vehicle is first powered on and/or periodically throughout normal operation of the autonomous vehicle.

The system 100 can be configured to receive data describing the vehicle 102 at the registry server computing system(s) 104 from the vehicle computing system 112. For example, the data describing the vehicle 102 can include a vehicle identification number (VIN), a vehicle alias, or any other suitable data describing the vehicle 102. A vehicle alias can be or include an identifier assigned to the vehicle 102 by the operator of a rideshare service or any other suitable unique name, label, or other data that can be used to identify the vehicle. For example, this data describing the vehicle 102 can be automatically sent in a variety of circumstances, such as when the vehicle 102 is first powered on and/or periodically throughout normal operation. The operations can include generating, at the registry server computing system 104, a vehicle identifier for the vehicle 102 based on the data describing the vehicle 102. The vehicle identifier can be different than and distinct from the data describing the vehicle 102. As examples, the vehicle identifier can be or include a number, text, or an alpha-numeric string distinct from the data describing and/or associated with the vehicle 102. The operations can include associating, at the registry server computing system 104, the data (e.g., VIN number, vehicle alias, etc.) that describes the vehicle 102 with the vehicle identifier for the vehicle 102 in a vehicle registry (e.g., table, list, tree, other data structure stored within a database, etc.), which can be maintained at the registry server computing system(s) 104. The registry server computing system 104 can assign the vehicle identifier to the vehicle 102. The vehicle identifier can subsequently be used to route communication to and from the vehicle 102, to track the vehicle 102, and/or maintain a log of information about the vehicle 102. Thus, the registry server computing system 104 can control and/or facilitate communications with vehicle(s) 102 and/or cross-reference between one or more databases with respect to the vehicle(s) 102.

One or more aspects the present disclosure can be performed with a back-end service 110 and/or front-end interface 111. Vehicle service assignment can be associated with a single or multiple mode itinerary. For example, a user can request transportation of the user from an origin location to a destination location. The deployment back-end service 110 can determine that a vehicle is available to provide the vehicle service for the user based at least in part on the vehicle identifier, which can be stored with a current status of the vehicle. The deployment back-end service 110 can determine that the vehicle is capable of transporting the user from the origin location to the destination location by using the vehicle identifier to retrieve the vehicles current location and operational capabilities (e.g., autonomy capabilities) from one or more databases and/or other services. The deployment back-end service 110 can create an itinerary for the vehicle that includes data indicative of the origin/destination locations, a route for the vehicle, timing information (e.g., pick-up/drop-off time(s), etc.), user information (e.g., preferences, accommodates, etc.), and/or other information. The deployment back-end service 110 (e.g., command center 216) can assign the itinerary to the vehicle by storing the vehicle identifier with data indicative of the itinerary, user, etc. and communicating data indicative of the itinerary to the vehicle. The deployment back-end service 110 can utilize the vehicle identifier when communicating data to the vehicle to ensure that it is routed properly and/or can utilize the vehicle identifier when obtaining data from the vehicle 102 (e.g., vehicle computing system 112) to ensure the itinerary is monitored in real-time (e.g., as the itinerary state changes from picking-up the user, travelling to the destination location, dropping-off the user, etc.).

In some implementations, the vehicle identifier can be utilized to help generate a multi-modal itinerary for the user. For example, a multi-modal transportation service can include travel by ground autonomous vehicle, travel by aircraft, and other suitable transportation modes (e.g., bus, boat (e.g., ferry), train, etc.). The various modalities can be provided by one or more service providers or service provider systems. For example, a first service provider computing device can provide and/or arrange a first transportation modality, a second service provider computing device can provide and/or arrange a second transportation modality, an Nth service provider computing device can provide and/or arrange an Nth transportation modality, and so forth.

The service platform can facilitate and select a multi-modal transportation service based on a variety of factors. One example factor includes the types of transportation modalities that are required, practical, and/or efficient to reach the destination, for example due to the autonomous capabilities of available vehicles, inaccessibility or impracticality of transport via particular transportation modalities. For instance, a land route over a bridge may take substantially longer than taking a ferry or air transportation over an intervening body of water. As another example factor, a user's preference or explicit selection of a specific transportation modality can be considered when facilitating a multi-model transport. For instance, a user can explicitly select or generally prefer an aerial transport, public transport, or another transportation modality. In such an instance, the platform can facilitate a multi-modal transportation service according to the user's preference or request. In the above examples, the service platform can facilitate such multi-modal trips using the various respective vehicle identifiers of the vehicles (e.g., self-driving car, autonomous aircraft, etc.) to the one or more legs of the itinerary that are provided by the service platform.

In some embodiments, the vehicle identifier can be utilized by a routing back-end service 110 to help improve the monitoring and coordination of vehicle routing. For example, the routing back-end service 110 of the service platform can utilize the vehicle identifier to obtain (e.g., via request, pull, etc.) data indicative of the software versions of the associated vehicle 102. The software versions can indicate, for example, whether an autonomous vehicle 102 has the most recent autonomy software versions. This can help determine the best route for an autonomous vehicle 102 to traverse while providing a vehicle service.

Additionally, or alternatively, the vehicle identifier can help improve the ability of the routing back-end service 110 to assign, coordinate, monitor, adjust, etc. the user of one or more designated pick-up and/or drop-off zones. For example, the service entity can be associated with one or more designated pick-up and/or drop-off zones that can be utilized for its fleet of vehicles 102. These zones can be designated areas on and/or near a travel way or parking area where the vehicle 102 can stop, park, pull-over, etc. The routing back-end service 110 (and/or another service) can utilize the vehicle identifiers of the vehicles 102 to track which zones are being or are to be occupied by a vehicle 102, which zones are available, etc. by associated the vehicle identifier with data indicative of the zone in a database.

In some implementations, the vehicle identifier described herein can improve the offline functionalities of the service entity's infrastructure. For instance, as described herein, the system and methods of the present disclosure help avoid the need for a vehicle identifier to be created each time the vehicle 102 (e.g., onboard vehicle computing system 112) is booted. This can allow the service platform to coordinate and optimize the utilization of the service entity's vehicle fleet while one or more of the vehicles 102 are offline. For example, the vehicle identifier can be stored with data indicating the location of the vehicle 102 while the vehicle 102 is offline (e.g., a storage area, parking area, service depot, etc.). The vehicle identifier can also be stored with information describing an offline time duration associated with a vehicle 102. The offline time duration can indicate how long the vehicle 102 may be offline due, for example, to maintenance, computing updates, refueling, data downloading, etc. A routing back-end service 110 (or another service associated with supply positioning) can determine that it would be favorable to position one or more vehicles 102 in a certain area before the vehicles 202 go back online and become available to undertake vehicle service assignments. Based at least in part on the vehicle identifier (and its association with the vehicle location, offline time duration, etc.), the back-end service 110 can utilize the vehicle identifier to determine which vehicle(s) 102 can be re-positioned from their current locations to these certain areas in the most efficient manner, before those vehicles 102 go online with the service platform. Additionally, or alternatively, the back-end service 110 can determine whether the vehicle 102 is in the appropriate location (e.g., service depot) and has enough time to receive a software update while the vehicle 102 is offline based at least in part on the vehicle identifier (and its association with the vehicle location, offline time duration, etc.). This can depend on whether the service depot has the hardware and/or communicability infrastructure to facilitate such a software updating process. In this way, the systems and methods described herein can generate a vehicle identifier that improves the efficiency of the service entity infrastructures offline functionalities.

Figure 2:
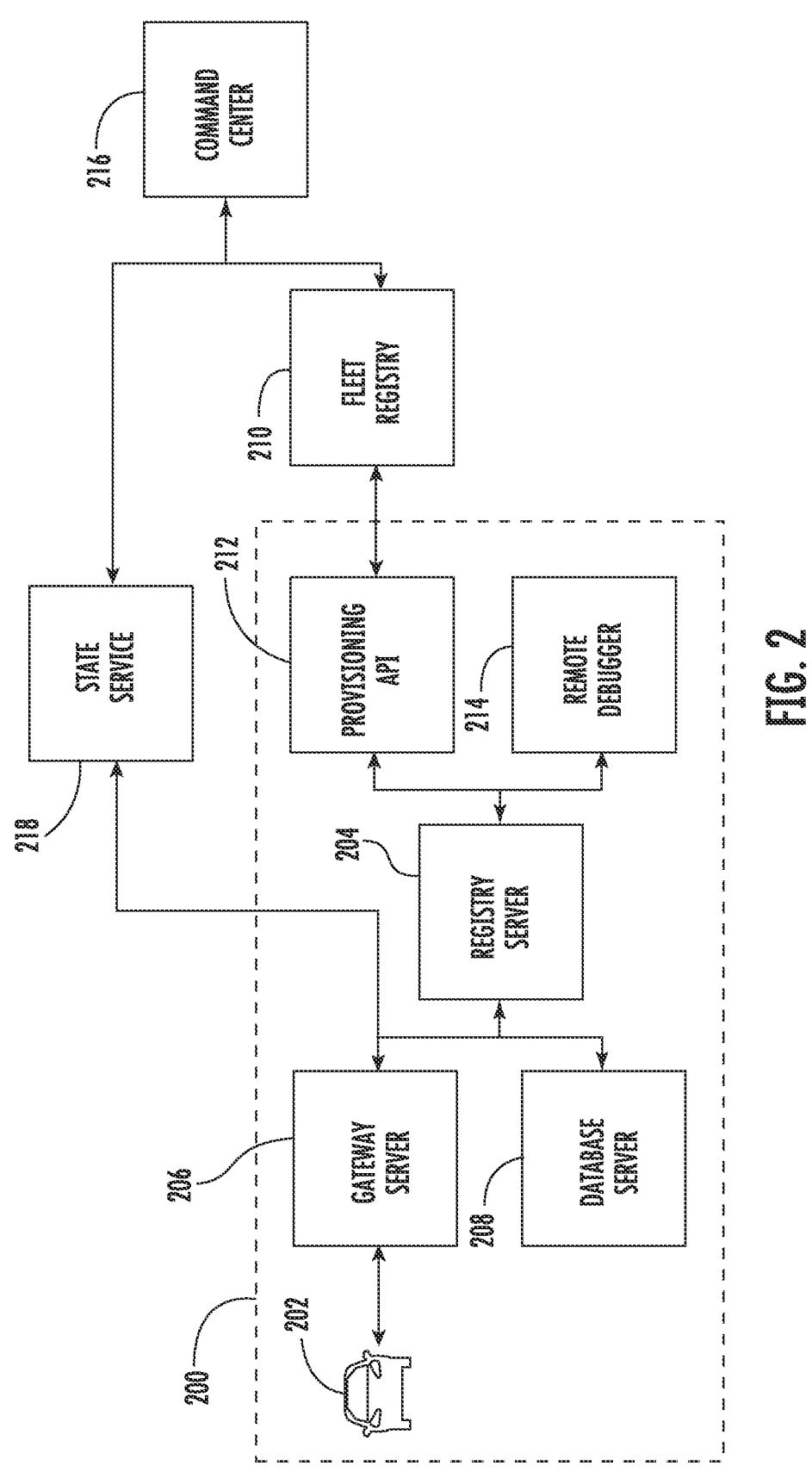
FIG. 2 depicts an example schematic overview of a system for automatically assigning vehicle identifiers for autonomous vehicles according to example implementations of the present disclosure.

FIG. 2 depicts an example schematic overview of a system 200 for automatically assigning vehicle identifiers for autonomous vehicles 202 according to example implementations of the present disclosure. The system 200 can be configured to receiving data describing the vehicle 202 at the registry server computing system(s) 204 and from the vehicle computing system of the vehicle 202 (e.g., via one or more gateway servers 206). For example, the vehicle 202 can transmit the data describing the vehicle 202 when the vehicle 202 is powered on, when the vehicle 202 enters an autonomous operation mode, or in other suitable circumstances. The data describing the vehicle 202 can include a vehicle identification number (VIN), a vehicle alias, or any other suitable data describing the vehicle 202. This data describing the vehicle 202 can be automatically sent in a variety of circumstances, such as when the vehicle 202 is first powered on and/or periodically throughout normal operation. The operations can include generating, at the registry server computing system 202, a vehicle identifier for the vehicle 202 based on the data describing the vehicle 202. The vehicle identifier can be different than and distinct from the data describing the vehicle 202. As examples, the vehicle identifier can be or include a number, text, or an alpha-numeric string distinct from the data describing the vehicle 202. The operations can include associating, at the registry server computing system 204, the data (e.g., VIN number, vehicle alias, etc.) that describes the vehicle 202 with the vehicle identifier for the vehicle 202 in a vehicle registry (e.g., table, list, tree, other data structure stored within a database, etc.), which can be maintained at the registry server computing system(s) 204. The registry server computing system 204 can assign the vehicle identifier to the vehicle 102. The vehicle identifier can subsequently be used to route communication to and from the vehicle 202, to track the vehicle 202, and/or maintain a log of information about the vehicle 202. Thus, the registry server computing system 204 can control and/or facilitate communications with vehicle(s) 202 and/or cross-reference between one or more databases with respect to the vehicle(s) 202.

In some embodiments, the registry server computing system(s) 204 can be configured to perform a hash function with respect to the data that describes the vehicle 202 and/or other data to generate the vehicle identifier. For example, hashing can be formed for the vehicle alias, VIN number, or the like (e.g., with each other and/or with other data to generate the vehicle identifier). As one example, hashing can be performed with the vehicle alias and the VIN number. As a further example, hashing can be performed with the vehicle alias and data associated with the vehicle computing system of the vehicle 202 (e.g., software version, hardware identifiers, and the like). One of ordinary skill in the art would understand that a variety of other configurations are possible within the scope of this disclosure.

Additionally, vehicles 202 may provide status data that describes a status of the vehicle 202 to remote systems, servers, and/or databases (e.g., registry computing server 204, database server computing system 208, fleet registry database server computing system 210), and/or a command center 216) at a variety of times and in response to a variety of circumstances and/or events. For example, the status data can describe a change in status of an autonomous vehicle 202 and/or reporting of an event with respect to the autonomous vehicle 202. As examples, the status data can describe events and/or status changes of the autonomous vehicle 202 as part of a service (e.g., rideshare service, courier service, etc.), such as include picking up user(s), dropping off user(s), picking up item(s), dropping off item(s), and/or other status changes. As additional examples, the status data can indicate or describe the autonomous vehicle 202 having a mechanical issue (e.g., flat tire, air conditioning malfunction, or the like), becoming delayed (e.g., by traffic, road closures, etc.). Additionally, in some embodiments, the autonomous vehicle 202 can periodically provide status data that describes a location of the autonomous vehicle 202. Such data transmissions and/or messages can include and/or be identified by the vehicle identifier.

In an example embodiment, the registry server computing system(s) 204 can distribute the vehicle identifier to other systems and/or devices. As examples, the registry server computing system(s) 204 can transmit data describing the vehicle identifier to one or more of the vehicle computing system of the vehicle 202, the database server computing systems 208, and/or on or more destinations that are external to the system 200 (e.g., the fleet registry database server system 210, command center 216, and/or a third party service provider). Thus, the registry server computing system(s) 204 can distribute the vehicle identifier to various devices, systems, and/or databases.

In some embodiments, the system 200 can be configured to facilitate communications, such as transmission of data and/or messages, with one or more other server computing systems and/or databases. The system 200 can facilitate communications with the database server computing system 208 and/or the fleet registry database server computing system 210, which can maintain respective databases of information (e.g., metadata) for the vehicle(s). For example, the registry server computing system 204 can communicate with the fleet registry database server computing system 210 via a provisioning application programming interface (API) 212. The provisioning API 212 can be included in the database server computing system 208 and/or the fleet registry database server computing system 210. The provisioning API 212 can facilitate communication by providing standardized formats, language, syntax, or the like for data exchanged between the registry server computing system 204 and fleet registry database server computing system 210. The registry server computing system 204 can relay such communications other destinations such as the vehicle computing system of the vehicle 202 via the gateway server 206 and/or to the database server computing system 208.

The system 200 (e.g., registry server computing system 204) can correlate information and/or facilitate updates between the various databases 208, 210 using the vehicle identifier. For example, the registry server computing system 204 can be configured to control and/or monitor autonomous operations of the vehicle 202. The database server computing system(s) 208 can maintain respective databases with respect to additional information (e.g., metadata) about the vehicle 202, such as vehicle service information (e.g., miles until next oil change, miles until new tires needed, etc.) and/or vehicle configuration (e.g., make, model, sensor type, software version, etc.). The system 200 can aid in correlating such disparate databases through use of the vehicle identifier.

In some embodiments, the system 200 can associate various other identifiers for the vehicle 202 with the vehicle identifier in the registry to facilitate cross-referencing between various different databases of information. For example, the additional information describing the vehicle that is received from the database server computing system(s) 208, 210 can include a respective database ID for the vehicle associated with the database server computing system 208 and/or a fleet database ID for the vehicle associated with the fleet registry database server computing system(s) 210. The database ID for the vehicle 202 can be or include a handle or label by which the database server computing system 208 identifies information pertaining to the vehicle 202. Similarly, the fleet database ID for the vehicle 202 can be or include a handle or label by which the fleet database server computing system 210 identifies information pertaining to the vehicle 202. The system 200 can associate multiple different database IDS for the vehicle 202 from a plurality of databases such that data for the vehicle 202 can be cross-referenced across the plurality of databases. Thus, the system 200 can facilitate cross referencing between various databases of information.

A remote debugger system 214 can be configured to provide access for developers, administrators, and the like to access the system 200. For example, the remote debugger system 214 can be configured to permit creation of virtual test vehicles for testing and troubleshooting processes of the system 200. The virtual test vehicle can be assigned vehicle identifiers and otherwise processed with the features described herein. Thus, the remote debugger system 214 can facilitate and/or control access to the system 200 for development and/or troubleshooting purposes.

The system 200 is illustrated in the context of other systems and/or devices, such as a command center computing system 216 and/or a state service computing system 218. The command center computing system 216 can be configured to control one or more operations of the autonomous vehicles 202, for example in a ride-share service, courier service, or the like. Examples include assigning autonomous vehicles 202 to respective trips, destinations, scheduling maintenance and/or servicing for the autonomous vehicles 202, and the like.

By utilizing the systems and methods described herein, a service entity can improve the ability for its infrastructure to communicate with and coordinate assignments for its fleet of vehicles 202 (e.g., autonomous vehicles). For example, the registry server computing system 204 can communicate with a vehicle service assignment deployment back-end service of the service platform. The back-end service of the service platform can correspond with the back-end service 110 of FIG. 1 and/or the offboard service of 410 of FIG. 4. The deployment back-end service 110 can obtain vehicle identifier(s) from the registry server computing system 204 and determine which of the vehicles 202 (e.g., autonomous vehicles) are or will become available to provide vehicle services. Such determination can be made by comparing the vehicle identifier(s) from the registry server computing system 204 with messages from the vehicles 202 that are online with the service platform. The deployment back-end service 110 can record any vehicle service assignments with the vehicle identifier to track which vehicles 202 are currently assigned a vehicle service, projected to be assigned a vehicle service, may be finishing a vehicle service assignment, or not assigned a vehicle service assignment/available to do so.

The system 200 can provide various security benefits, for example with respect to vehicle identifiers that have been compromised and/or used in an unauthorized manner. For instance, a vehicle identifier that is nefariously used to impersonate a vehicle 202 (e.g., in a fleet of autonomous vehicles) can pose as a safety and security risk for operations of the other vehicles 202 (e.g., fleet of autonomous vehicles). Detecting and reacting to such unauthorized uses of vehicle identifiers can improve safety and security. While a platform for coordinating and managing a fleet of autonomous vehicle 202 can include other preventive measures, such detection and reaction can be further facilitated by the server-based generation of the vehicle identifiers described herein.

For example, in one embodiment, the system 200 can detect an unauthorized use of the vehicle identifier and generate a new vehicle identifier for the vehicle 202 in response to detecting the unauthorized use of the vehicle identifier. The new vehicle identifier can be associated with the vehicle 202 at the registry server computing system 204 (e.g., in the vehicle registry). The old vehicle identifier can be disassociated with the vehicle 202 and/or flagged as compromised in the vehicle registry of the registry server computing system 204. The registry server computing system 204 can communicate data describing the compromised vehicle identifiers to other systems (e.g., the database server computing system(s) 208, the fleet registry database server computing system(s) 210, and/or the command center 216). As a result, use of compromised vehicle identifier (e.g., by third parties for a nefarious purpose) can be curtailed, identified, and/or isolated. Subsequent communications received with reference to such compromised vehicle identifiers can be identified as unauthorized and/or disregarded. Thus, the system 200 can provide security advantages by detecting and/or preventing unauthorized use of vehicle identifiers.

The system 200 can generate and assign new vehicle identifiers in a variety of other circumstances as well. For example, in some embodiments, a new vehicle identifier can be generated and assigned each time a given vehicle 202 is powered on, has a software update, and/or has a physical hardware update. Thus, a frequency at which the registry server 204 updates the vehicle identifiers can vary in some embodiments.

Figure 3:
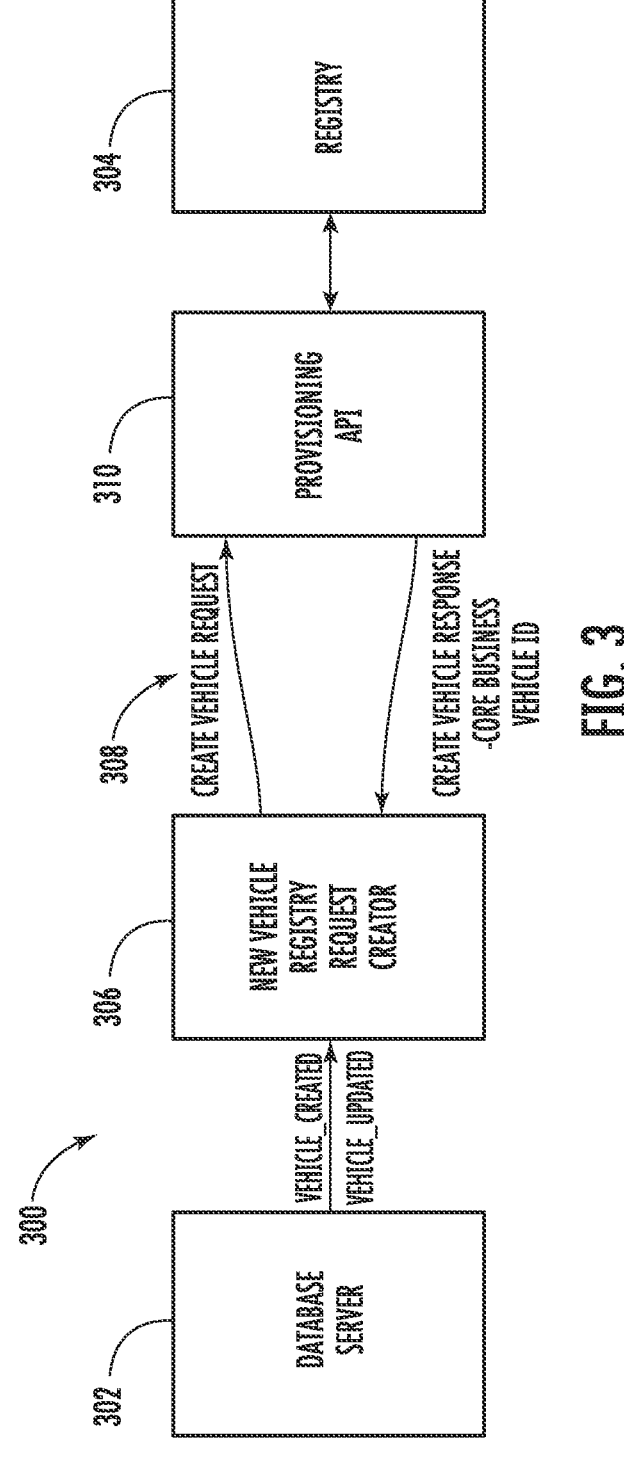
FIG. 3 depicts an example schematic overview of a system for automatically updating information for autonomous vehicles according to example implementations of the present disclosure.

FIG. 3 depicts an example schematic overview of a system 300 for automatically updating information for autonomous vehicles according to example implementations of the present disclosure. In some embodiments, the database server computing system(s) 302 can push updates to the registry server computing system to update a registry of the registry server computing system 304. This push update can occur, for example, when a vehicle is created or updated in the database server computing system 302. A vehicle registry request creator 306 can transmit a request 308 to create/update a vehicle via a provisioning application programming interface (API) 310 (e.g., of the registry computing system). The registry computing system can generate a vehicle identifier for the autonomous vehicle based on the data describing the autonomous vehicle. The vehicle identifier can be different than and distinct from the data describing the autonomous vehicle. The registry computing system 304 can associate the data describing the autonomous vehicle with the vehicle identifier for the autonomous vehicle in the vehicle registry 304. The vehicle registry 304 can include respective vehicle identifiers associated with a plurality of autonomous vehicles. The registry computing system can transmit the vehicle identifier via the provisioning API 310 and/or the database server 302.

The database server computing system 302 can transmit additional information describing the vehicle to the registry server computing system to update the registry 304. In some embodiments, the additional information can be transmitted automatically and/or without a request or query by the registry server computing system. As indicated above, examples of such additional information can include vehicle service information (e.g., miles until next oil change, miles until new tires needed, etc.) and vehicle configuration information (e.g., license plate information, make, model, sensor type, software version, etc.). The system can associate the additional information describing the vehicle with the vehicle identifier in the vehicle registry 304, which can be stored at the registry server computing system. Thus, the system can automatically update the vehicle registry 304 based on changes in other databases (e.g., stored at database server computing systems 302).

For example, a license plate number for a given vehicle can be updated in a database stored at the database server 302. The database server 302 can push a notification of this update to the registry 304 at the registry computing server system in response to the license plate number being changed at the database server 302. The registry 304 can be automatically updated to reflect the new license plate number.

However, in other embodiments, the registry server computing system can periodically query the database server computing system(s) 302 to determine whether data has been updated for the vehicle(s). The registry server computing system can then retrieve or pull such updated data. The push methods described above, however, can generally reduce the consumption of computing resources as the registry server does not need to periodically query the database server computing system(s) in such a configuration.

Figure 4:
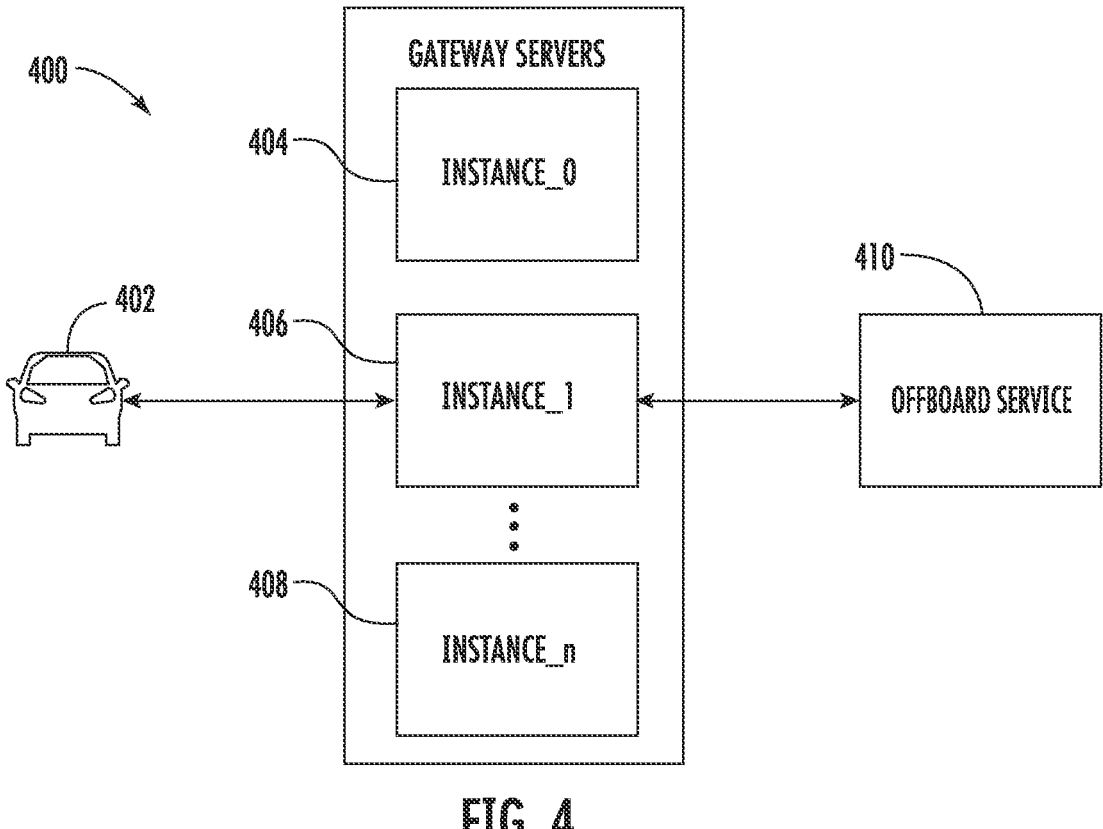
FIG. 4 depicts an example schematic overview of a system for automatically assigning vehicle identifiers for autonomous vehicles according to example implementations of the present disclosure.

FIG. 4 depicts an example schematic overview of a system 400 for automatically assigning vehicle identifiers for autonomous vehicles 402 according to example implementations of the present disclosure. In some embodiments, the vehicle identifier can be used to route communications via one or more of the multiple server devices 404, 406, 408 between the vehicle computing system of the vehicle 402 and one or more offboard services 410. The offboard services 410 can correspond with the back-end services 110 of FIG. 1. For example, the vehicle identifier can be shared with the multiple server devices 404, 406, 408 (e.g., gateway server devices). The multiple server devices 404, 406, 408 can correspond with the gateway server(s) 206 of FIG. 2. Communications for a given vehicle 402 can be routed through one or more of the multiple server devices 404, 406, 408 based on the vehicle identifier to ensure that the routes for such communications are effective, known, and/or not duplicative. For example, the vehicle identifier can be used to ensure that communications for a given vehicle are transmitted through the same server or combination of servers over a period of time (e.g., based on the location of the vehicle 402, for a single operating session of the vehicle 402, and the like).

Figure 5:
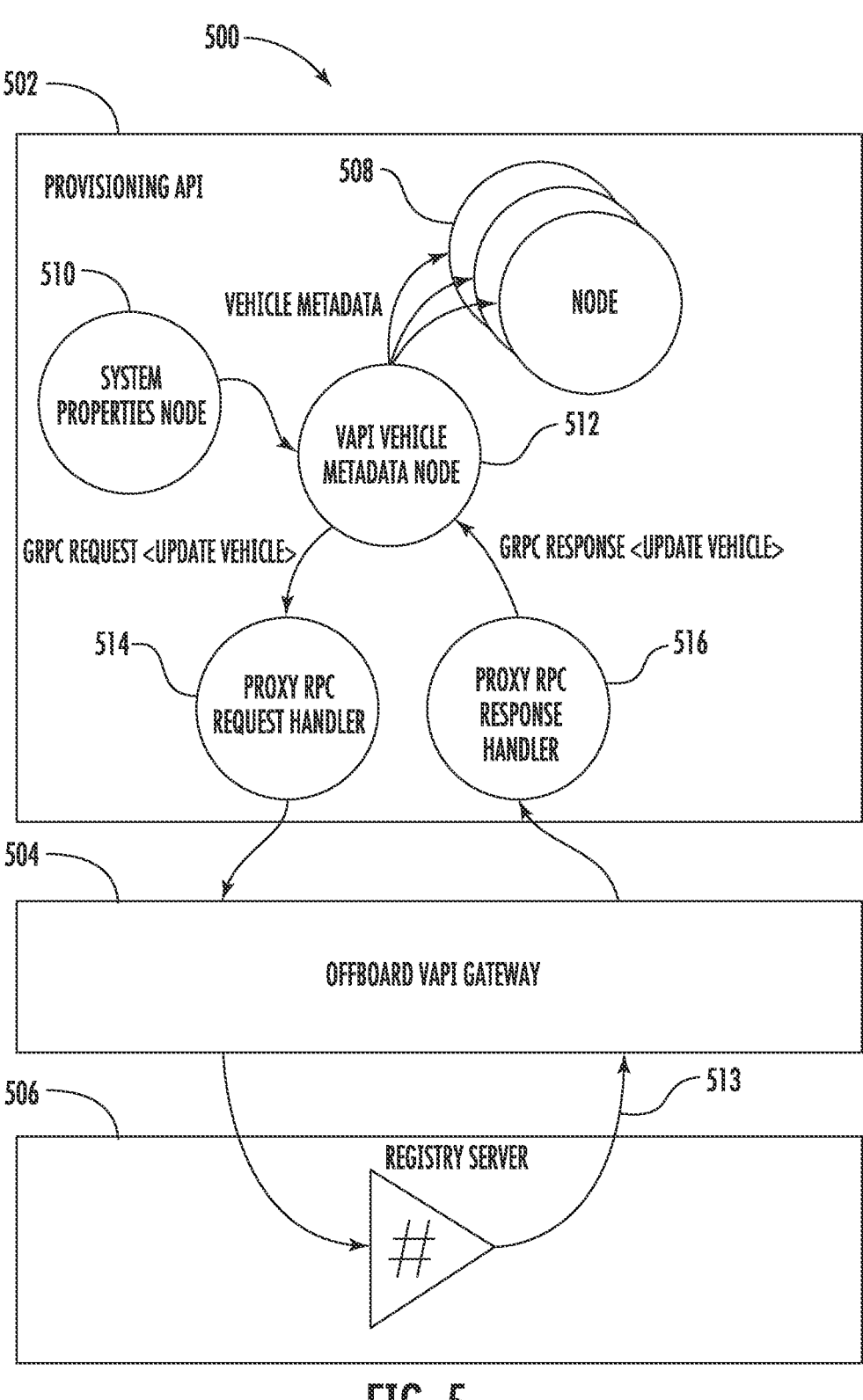
FIG. 5 depicts an example schematic overview of a system for automatically assigning vehicle identifiers for autonomous vehicles according to example implementations of the present disclosure.

FIG. 5 depicts an example schematic overview of a system 500 for automatically assigning vehicle identifiers for autonomous vehicles according to example implementations of the present disclosure. A provisioning API 502 and a gateway server computing system 504 can facilitate communication between a registry server 506 (e.g., of the registry server computing system) and one or more external nodes 508. The provisioning API 502 can be stored by and/or executed by the vehicle computing system. The external nodes 508 can represent devices and/or systems that are external with respect to the provisioning API 502. Example external nodes 508 include vehicle manufacturers, equipment manufacturers, and any other service provider and/or database. For instance, the vehicle identifier can be transmitted to an external node 508 that includes and/or corresponds with a database server computing system 106, 208, 302, 602, for example as described with reference to FIGS. 1, 2, 3, and 6 and/or the fleet registry server computing device 106, 210, 612, 712, for example as described with reference to FIGS. 1, 2, 6, and 7. The external node 508 (e.g., database server computing system 106, 208, 302, 602 and/or fleet registry server computing device 106, 210, 612, 712) can associate the vehicle identifier with data associated with the vehicle for future communications. For instance, the vehicle identifier can be included in future communications from the external database server computing system 106, 208, 302, 602 to identify the vehicle associated with the communication.

A systems properties node 510 represents storage of information about the vehicle, for example, in the vehicle computing system. When a vehicle is booted, the systems properties node 510 can transmit data describing the vehicle to the API vehicle metadata node 512. The API vehicle metadata node 512 can transmit the data that describes the vehicle from the systems properties node 510 (e.g., from the vehicle computing system) to the registry server 506 through one or more of the a first proxy request handler 514, and/or the gateway server computing system 504. The registry server 506 can receiving the data describing the autonomous vehicle from the vehicle computing system and generate a vehicle identifier for the autonomous vehicle based on the data describing the autonomous vehicle. The registry server 506 can associate the data describing the autonomous vehicle with the vehicle identifier for the autonomous vehicle in a vehicle registry.

The registry server 506 an transmit the vehicle identifier 513 to the system properties node 510 (e.g., vehicle computing system) and/or one or more of the external nodes 508 via one or more of the API vehicle metadata node 512, a second proxy request handler 516, and/or the gateway server computing system 504. Thus, the system 500 can generate vehicle identifiers for vehicles and communicate them to one or more of the vehicle computing system and/or external nodes 508 (e.g., databases, computing device, computing systems, etc.).

Figure 6:
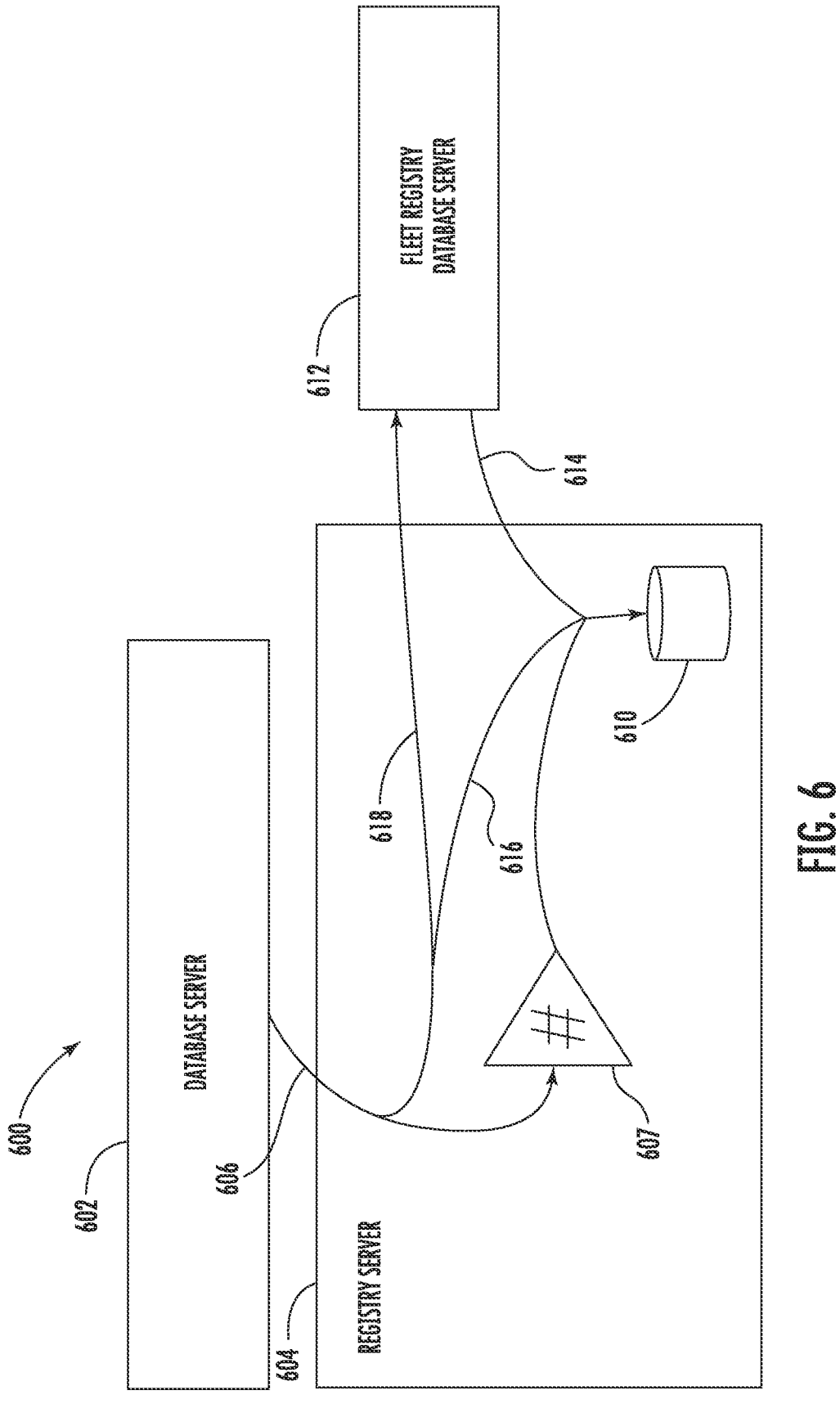
FIG. 6 depicts an example schematic overview of a system for automatically updating information for autonomous vehicles according to example implementations of the present disclosure.

FIG. 6 depicts a simplified schematic 600 for automatically updating information for autonomous vehicles according to example implementations of the present disclosure. In some embodiments, the database server computing system(s) 602 can push updates to a registry server computing system 604. Push updates can occur, for example, when a vehicle is created or updated in the database server computing system 602. For example, vehicle service information (e.g., miles until next oil change, miles until new tires needed, etc.) and/or vehicle configuration information (e.g., license plate information, make, model, sensor type, software version, etc.) for a vehicle can be updated at the database server computing system(s) 602. In response, the database server computing system(s) 602 can transmit a request to create a vehicle (e.g., a vehicle profile) and/or update vehicle information for the vehicle. The request 606 can include additional information (represented by arrows 616 and 618) describing the vehicle service information, vehicle configuration information, and/or other identifying information (e.g., vehicle alias, VIN number, etc.). The registry server computing system 604 can generate a vehicle identifier 607 for the autonomous vehicle based on the data describing the autonomous vehicle (e.g., VIN number, vehicle alias, etc.). The vehicle identifier 607 can be different than and distinct from the data describing the autonomous vehicle of the request 606. The registry server computing system 604 can associate the data 616 describing the autonomous vehicle of the request 606 with the vehicle identifier for the autonomous vehicle in a registry 610 (e.g., table, list, tree, other data structure stored within a database, etc.) of the registry server 604. The registry 610 can include respective vehicle identifiers associated with a plurality of autonomous vehicles.

The request 606 and/or data 618 that describes that vehicle of the request 606 can be transmitted to a fleet registry database server computing system 612 (for example via the registry server computing system 604). The fleet registry database server computing system 612 can create a vehicle (e.g., vehicle profile) in response to the request 606 or update information for the vehicle in response to the request 606. The fleet registry database server computing system 612 can transmit additional information 614 describing the vehicle to the registry server computing system 604 and the registry server computing system 604 can update the registry 610 to include the additional information 614. The additional information 614 can be associated with the respective vehicle identifier of the vehicle in the registry 610. Thus, the registry server 604 can facilitate cross-referencing and/or combining of data from different databases and/or servers.

In some embodiments, the additional information can be transmitted automatically (e.g., without a request or query from the registry server computing system 604). The additional information 614 can include vehicle identification information that is distinct form the vehicle identifier (e.g., an identifier assigned to the vehicle by the fleet registry database server computing system 612). As indicated above, examples of such additional information can include vehicle service information (e.g., miles until next oil change, miles until new tires needed, etc.), vehicle configuration information (e.g., license plate information, make, model, sensor type, software version, etc.), and/or any other vehicle information described herein. The system can associate the additional information 614 describing the vehicle from the registry database server computing system 612 with the vehicle identifier in the vehicle registry 610. Thus, the system can automatically update the vehicle registry 610 based on changes in other databases (e.g., database server computing system 602, fleet registry server computing system 612, and/or any other suitable vehicle databases) and can reconcile communications between such various databases despite different vehicle identifiers being used by the various databases.

However, in other embodiments, the registry server computing system can periodically query the database server computing system(s) 602 and/or fleet registry server computing system 612 to determine whether data has been updated for the vehicle(s). The registry server computing system 604 can then retrieve or pull such updated data. The push methods described above, however, can generally reduce the consumption of computing resources as the registry server does not need to periodically query the database server computing system(s) 602, 612.

Figure 7:
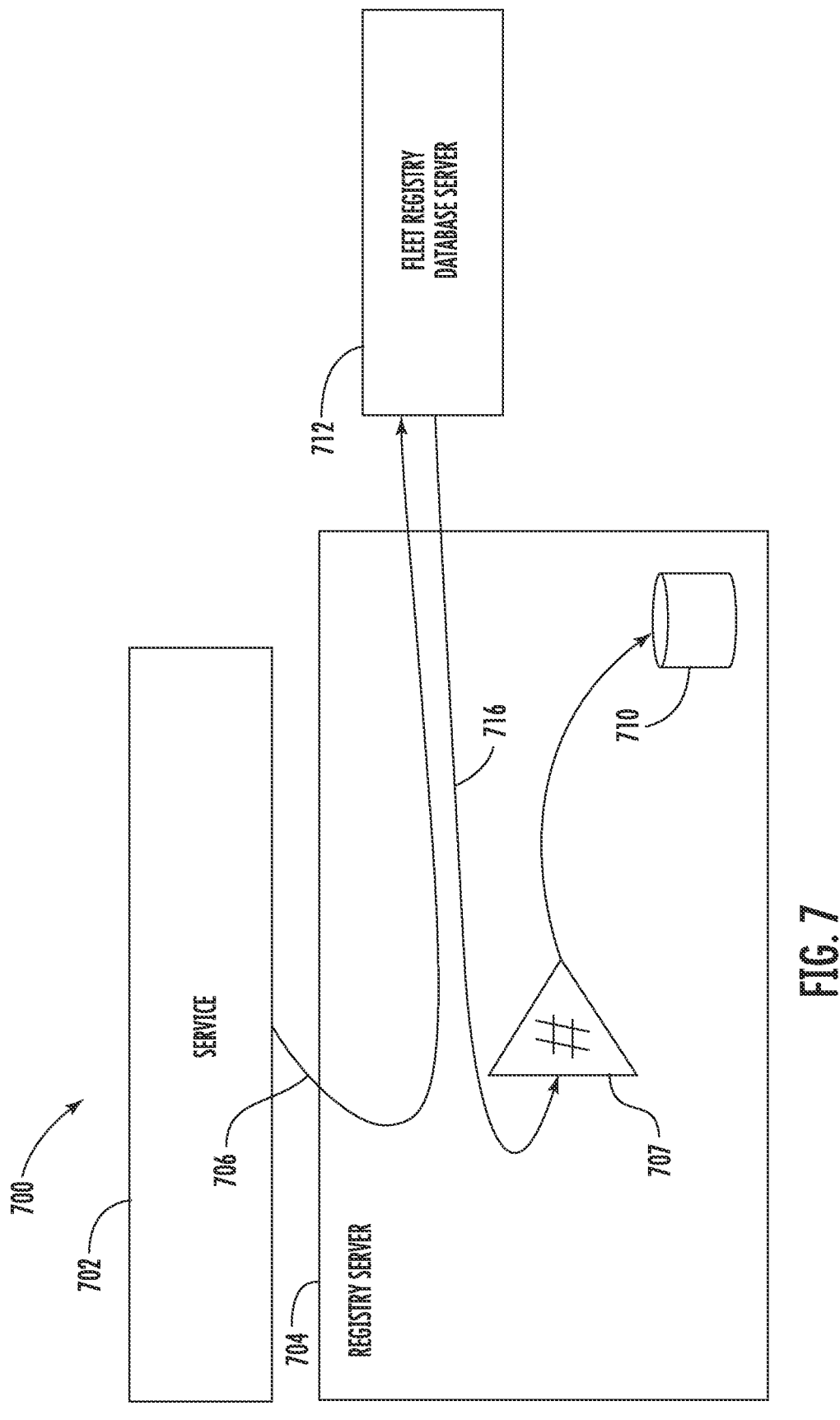
FIG. 7 depicts an example schematic overview of a system for automatically updating information for autonomous vehicles based on information received from a third-party service according to example implementations of the present disclosure.

FIG. 7 depicts a simplified schematic 700 for automatically updating information for autonomous vehicles based on information received from a third-party service 702 according to example implementations of the present disclosure. The third-party service 702 can include an automotive manufacturer, an equipment manufacturer, and/or any other third-party service 702 that may provide system with updated information about a vehicle. For example, an automotive manufacturer can provide information about updated service requirements (e.g., because of a recall or the like). An equipment manufacturer can provide software updates, for example, for sensors, computing hardware (processors, memory, etc.), and the like. The third-party service 702 can transmit data 706 to a fleet registry database computing system 704 (e.g., via the registry server computing system 705). The fleet registry database computing system 704 can transmit data 716 describing the vehicle to the registry server computing system 704. The data 716 can include and/or describe the data 706 from the service 702 and/or include additional data describing the vehicle.

The registry server computing system 704 can generate a vehicle identifier 707 for the autonomous vehicle based on the data describing the autonomous vehicle (e.g., included in the data 716 from the fleet registry database server computing system 712). The vehicle identifier 707 can be different than and distinct from the data 716 describing the autonomous vehicle from the fleet registry database server computing system 712. The registry server computing system 704 can associate the data (e.g., data 716 and/or data 706) describing the autonomous vehicle with the vehicle identifier for the autonomous vehicle in a registry 710 (e.g., table, list, tree, other data structure stored within a database, etc.) of the registry server computing system 704. The registry server computing system 704 (e.g., registry 710) can include respective vehicle identifiers associated with a plurality of autonomous vehicles. Thus, the registry server computing system 704 can receive communications from the services 702 (e.g., third party services) and facilitate updating of registry 710 and/or other databases, such as the fleet registry database server computing system 712 based on such communication from the services 702.

FIG. 8 depicts an example flow diagram of an example method 800 for automatically assigning vehicle identifiers for autonomous vehicles according to example implementations of the present disclosure. One or more portion(s) of the method 800 can be implemented by a computing system that includes one or more computing devices such as, for example, the computing systems described with reference to the other figures (e.g., the vehicle computing system 100, the registry server computing system(s) 104, the database server computing system(s) 106, the operations computing system 109, etc.). Each respective portion of the method actions can be performed by any (or any combination) of one or more computing devices. Moreover, one or more portion(s) of the method actions can be implemented as an algorithm on the hardware components of the device(s) described herein (e.g., as in FIGS. 1-7). Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 8 is described with reference to elements/terms described with respect to other systems and figures for example illustrated purposes and is not meant to be limiting. One or more portions of method actions can be performed additionally, or alternatively, by other systems.

Figure 10:
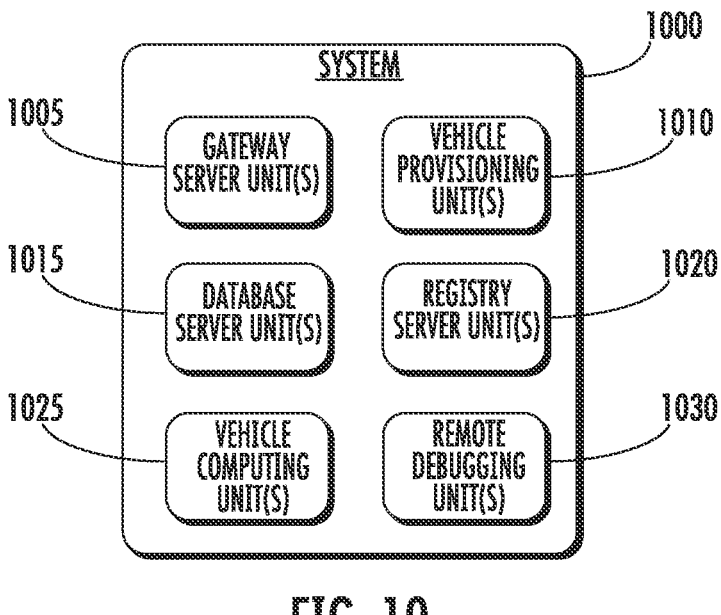
FIG. 10 depicts example system components of an example system according to example implementations of the present disclosure.

At (805), the method 800 can include receiving data describing the autonomous vehicle at the registry server computing system from a vehicle computing system onboard an autonomous vehicle. For example, the vehicle computing system can transmit data (e.g., a VIN number of the vehicle, a vehicle alias, or other identifying information) to the registry server computing system (e.g., via one or more servers, such as a gateway server), for example as described above with reference to FIGS. 2, 4, and 5. The register server unit(s) 1020 described below with reference to FIG. 10 is one example means for receiving data describing the autonomous vehicle at the registry server computing system and from a vehicle computing system onboard an autonomous vehicle. The vehicle computing unit(s) 1025 gateway server unit(s) 1005, for example as described below with reference to FIG. 10, are example means for transmitting the data to the registry server computing system.

At (810), the method 800 can include generating, at the registry server computing system, a vehicle identifier for the autonomous vehicle based on the data describing the autonomous vehicle. The vehicle identifier can be different than and distinct from the data describing the autonomous vehicle. For example, the registry server computing system(s) can be configured to perform a hash function with respect to the data that describes the vehicle and/or other data to generate the vehicle identifier. For example, hashing can be formed for the vehicle alias, VIN number, or the like (e.g., with each other and/or with other data to generate the vehicle identifier). As one example, hashing can be performed with the vehicle alias and the VIN number. As a further example, hashing can be performed with the vehicle alias and data associated with the vehicle computing system (e.g., software version, hardware identifiers, and the like). One of ordinary skill in the art would understand that a variety of other configurations are possible within the scope of this disclosure. The register server unit(s) 1020 described below with reference to FIG. 10 is one example means for generating, at the registry server computing system, a vehicle identifier for the autonomous vehicle based on the data describing the autonomous vehicle.

At (815), the method 800 can include associating, at the registry server computing system, the data describing the autonomous vehicle with the vehicle identifier for the autonomous vehicle in a vehicle registry. The vehicle registry can include respective vehicle identifiers associated with a plurality of autonomous vehicles. As example, the vehicle identifiers can be associated with make, model, VIN number, license plate information, status, software version(s), hardware specifications, and any other suitable data associated with and/or describing the vehicle in a database, such as a table, list, tree, or other data structure. The registry server unit(s) 1020 described below with reference to FIG. 10 is one example means for associating, at the registry server computing system, the data describing the autonomous vehicle with the vehicle identifier for the autonomous vehicle in a vehicle registry.

FIG. 9 depicts an example flow diagram of an example method 900 for automatically assigning vehicle identifiers for autonomous vehicles according to example implementations of the present disclosure. One or more portion(s) of the method 800 can be implemented by a computing system that includes one or more computing devices such as, for example, the computing systems described with reference to the other figures (e.g., the vehicle computing system 100, the registry server computing system(s) 104, the database server computing system(s) 106, the operations computing system 109, etc.). Each respective portion of the method actions can be performed by any (or any combination) of one or more computing devices. Moreover, one or more portion(s) of the method actions can be implemented as an algorithm on the hardware components of the device(s) described herein (e.g., as in FIGS. 1-7). Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 9 is described with reference to elements/terms described with respect to other systems and figures for example illustrated purposes and is not meant to be limiting. One or more portions of method actions can be performed additionally, or alternatively, by other systems.

At (905), the method 900 can include receiving, at the registry server computing system, data describing an autonomous vehicle. For example, the registry server computing system can receive the data from a database or service, such as the database server computing system and/or fleet registry database server system, for example as described above with reference to FIG. 6 and/or a service provider, for example as described above with reference to FIG. 7. The registry server computing system can receive the data from a vehicle computing system for example as described above with reference to FIGS. 2, 4, and 5. The register server unit(s) 1020 described below with reference to FIG. 10 is one example means for receiving data describing the autonomous vehicle at the registry server computing system and from a vehicle computing system onboard an autonomous vehicle. The vehicle computing unit(s) 1025 and gateway server unit(s) 1005 described below with reference to FIG. 10 are example means for transmitting the data to the register server unit(s) 1020.

At (910), the method 900 can include generating, at the registry server computing system, a vehicle identifier for the autonomous vehicle based on the data describing the autonomous vehicle. The vehicle identifier different than and distinct from the data describing the autonomous vehicle. For example, the registry server computing system(s) can be configured to perform a hash function with respect to the data that describes the vehicle and/or other data to generate the vehicle identifier. For example, hashing can be formed for the vehicle alias, VIN number, or the like (e.g., with each other and/or with other data to generate the vehicle identifier). As one example, hashing can be performed with the vehicle alias and the VIN number. As a further example, hashing can be performed with the vehicle alias and data associated with the vehicle computing system (e.g., software version, hardware identifiers, and the like). One of ordinary skill in the art would understand that a variety of other configurations are possible within the scope of this disclosure. The register server unit(s) 1020 described below with reference to FIG. 10 is one example means for generating, at the registry server computing system, a vehicle identifier for the autonomous vehicle based on the data describing the autonomous vehicle.

At (915), the method 900 can include associating, at the registry server computing system, the data describing the autonomous vehicle with the vehicle identifier for the autonomous vehicle in a vehicle registry. The vehicle registry can include respective vehicle identifiers associated with a plurality of autonomous vehicles. As example, the vehicle identifiers can be associated with make, model, VIN number, license plate information, status, software version(s), hardware specifications, and any other suitable data associated with and/or describing the vehicle in a database, such as a table, list, tree, or other data structure. The registry server unit(s) 1020 is one example means for associating, at the registry server computing system, the data describing the autonomous vehicle with the vehicle identifier for the autonomous vehicle in a vehicle registry.

At (920), the method 900 can include receiving, at the registry server computing system from a database server computing system, additional information describing the autonomous vehicle. For example, the database server computing system and/or fleet registry database server computing system can transmit additional information describing the vehicle to the registry server computing system to update the registry, for example as described above with reference to FIG. 6. The additional information can be transmitted automatically and/or without a request or query by the registry server computing system. The additional information can include vehicle identification information that is distinct form the vehicle identifier (e.g., an identifier assigned to the vehicle by the fleet registry database server computing system 612). As indicated above, examples of such additional information can include vehicle service information (e.g., miles until next oil change, miles until new tires needed, etc.), vehicle configuration information (e.g., license plate information, make, model, sensor type, software version, etc.), and/or any other vehicle information described herein. The system can associate the additional information describing the vehicle from the registry database server computing system with the vehicle identifier in the vehicle registry. Thus, the system can automatically update the vehicle registry based on changes in other databases (e.g., database server computing system, the fleet registry server computing system, and/or any other suitable vehicle databases) and can reconcile communications between such various databases despite different identifiers being used by the various databases. The register server unit(s) 1020 described below with reference to FIG. 10 is one example means for receiving data describing the autonomous vehicle at the registry server computing system and from a vehicle computing system onboard an autonomous vehicle. The vehicle computing unit(s) 1025 gateway server unit(s) 1005, for example as described below with reference to FIG. 10, are example means for transmitting the data to the registry server computing system.

FIG. 10 depicts example system components of an example system according to example implementations of the present disclosure. Various means can be configured to perform the methods and processes described herein. For example, a computing system 1000 can include gateway server unit(s) 1005, vehicle provisioning unit(s) 1010, database server unit(s) 1015, registry server unit(s) 1020, vehicle computing unit(s) 1025, remote debugging unit(s) 1030, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to receive, at the registry server computing system and from the vehicle computing system, data describing the vehicle. The registry server unit(s) 1020, vehicle computing unit(s) 1025, and/or gateway server unit(s) 1005 are example means for receiving data describing the vehicle at the registry server computing system 1020 from the vehicle computing system 1025.

The means can be configured to generate, at the registry server computing system 1020, a vehicle identifier for the vehicle based on the data describing the vehicle. The vehicle identifier can be different than and distinct from the data describing the vehicle. For example, a hash function can be performed with respect a vehicle alias, VIN number, and/or other data (software version, hardware identifiers, and the like). The registry server unit(s) 1020 is an example means for generating, at the registry server computing system, the vehicle identifier for the vehicle based on the data describing the vehicle system.

The means can be configured to associate, at the registry server computing system, the data describing the vehicle with the vehicle identifier for the vehicle in a vehicle registry. The registry server unit(s) 1020 is an example means for associating, at the registry server computing system, the data describing the vehicle with the vehicle identifier for the vehicle in a vehicle registry.

ADDITIONAL DISCLOSURE

The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 8 and 9 depict steps performed in a particular order for purposes of illustration and discussion, the methods of the present disclosure are not limited to the particularly illustrated order or arrangement. The various steps of the methods 800, 900 can be omitted, rearranged, combined, and/or adapted in various ways without deviating from the scope of the present disclosure.

What is claimed is:

1. A system for automatically assigning vehicle identifiers for autonomous vehicles, the system comprising:
    a registry server computing system comprising one or more processors and one or more non-transitory computer-readable media that collectively store instructions that, when executed by the one or more processors, cause the registry server computing system to perform operations, the operations comprising:
    receiving, at the registry server computing system and from a vehicle computing system onboard an autonomous vehicle, vehicle identification data, the vehicle identification data identifying the autonomous vehicle;
    generating, at the registry server computing system, a vehicle identifier unique to the autonomous vehicle based on applying a hash transformation function directly to the vehicle identification data, the vehicle identifier different than and distinct from the vehicle identification data; and
    associating, at the registry server computing system, the vehicle identification data with the vehicle identifier for the autonomous vehicle in a vehicle registry, wherein the vehicle registry comprises respective vehicle identifiers associated with a plurality of autonomous vehicles; and
    an operations server computing system comprising one or more processors and one or more non-transitory computer-readable media that collectively store instructions that, when executed by the one or more processors, cause the operations server computing system to implement a routing service and a deployment service and perform operations comprising:
    receiving a service request from a user, the service request including at least one of a pickup location, a destination location, or a service type;
    querying the vehicle registry using the vehicle identifier generated by the hash transformation function to retrieve autonomous vehicle characteristics, the autonomous vehicle characteristics including at least one of autonomy capabilities, software version, or vehicle configuration;
    identifying at least a portion of the service request that can be serviced by the autonomous vehicle based on matching the autonomous vehicle characteristics from the vehicle registry to requirements of the service request; and
    transmitting the vehicle identifier generated by the hash transformation function with data indicative of the portion of the service request to the autonomous vehicle via at least one of a plurality of intermediate server devices, wherein the vehicle identifier is used to route the data to the autonomous vehicle.

2. The system of claim 1, wherein the operations to be performed by the operations server computing system further comprise:
    identifying a first multi-modal portion of the service request and a second multi-modal portion of the service request, the first multi-modal portion including a first transportation vehicle type, the second multi-modal portion including a second transportation vehicle type that is different from the first transportation vehicle type;
    determining that the autonomous vehicle is compatible with the first transportation vehicle type; and
    identifying the first multi-modal portion as the portion of the service request that can be serviced by the autonomous vehicle.

3. The system of claim 1, wherein the operations to be performed by the registry server computing system further comprise associating data describing location information with the vehicle identifier, wherein identifying the portion of the service request is based on the location information.

4. The system of claim 1, wherein the operations to be performed by the registry server computing system further comprise obtaining, by the registry server computing system, status data from the vehicle computing system onboard the autonomous vehicle, the status data comprising the vehicle identifier.

5. The system of claim 4, wherein the status data describes at least one of a status associated with a vehicle service or a location of the autonomous vehicle associated with a vehicle service.

6. The system of claim 1, further comprising a database server computing system, and wherein the operations to be performed by the registry server computing system further comprise transmitting, from the registry server computing system to the database server computing system, the vehicle identifier for the autonomous vehicle.

7. The system of claim 1, further comprising a database server computing system, and wherein the operations to be performed by the registry server computing system further comprise:
    receiving, at the registry server computing system and from the database server computing system, additional information describing the autonomous vehicle; and
    associating, at the registry server computing system, the additional information describing the autonomous vehicle with the vehicle identifier in the vehicle registry.

8. The system of claim 1, wherein the operations to be performed by the registry server computing system further comprise obtaining, by the registry server computing system, a communication from the vehicle computing system onboard the autonomous vehicle, the communication comprising the vehicle identifier, and wherein the communication is routed using the vehicle identifier to the registry server computing system via at least one of a plurality of intermediate server devices.

9. The system of claim 1, wherein the vehicle identification data describes at least one of a vehicle identification number (VIN) or a vehicle alias.

10. The system of claim 1, wherein:

generating, at the registry server computing system, the vehicle identifier for the autonomous vehicle based on the data comprises applying the hash transformation function to both the vehicle identification data and to data associated with the vehicle computing system; and the data associated with the vehicle computing system includes at least one of a vehicle computing system software version or a vehicle computing system hardware identifier.

11. The system of claim 1, wherein:

the operations to be performed by the registry server computing system further comprise transmitting the vehicle identifier to one or more back-end services of a service entity associated with the autonomous vehicle; and the one or more back-end services are configured to provide services to a plurality of autonomous vehicles of the service entity including the autonomous vehicle, wherein the services include at least one of a service assignment service, a remote assistance service, or a routing service.

12. The system of claim 1, wherein the operations to be performed by the registry server computing system further comprise generating, at the registry server computing system and after associating the vehicle identification data with the vehicle identifier for the autonomous vehicle in the vehicle registry, a new vehicle identifier for the autonomous vehicle based on the vehicle identification data.

13. A method for automatically assigning vehicle identifiers for autonomous vehicles, the method comprising:

receiving, at a registry server computing system comprising one or more computing devices and from a vehicle computing system onboard an autonomous vehicle, vehicle identification data, the vehicle identification data identifying the autonomous vehicle;

generating, at the registry server computing system, a vehicle identifier unique to the autonomous vehicle based on applying a hash transformation function to the vehicle identification data, the vehicle identifier different than and distinct from the vehicle identification data;

associating, at the registry server computing system, the vehicle identification data with the vehicle identifier for the autonomous vehicle in a vehicle registry;

receiving, at an operations server computing system, a service request from a user, the service request including at least one of a pickup location, a destination location, or a service type;

querying the vehicle registry using the vehicle identifier generated by the hash transformation function to retrieve autonomous vehicle characteristics, the autonomous vehicle characteristics including at least one of autonomy capabilities, software version, or vehicle configuration;

identifying, at the operations server computing system, at least a portion of the service request that can be serviced by the autonomous vehicle based on matching the autonomous vehicle characteristics from the vehicle registry to requirements of the service request; and transmitting the vehicle identifier generated by the hash transformation function with data indicative of the portion of the service request to the autonomous vehicle via at least one of a plurality of intermediate server devices, wherein the vehicle identifier is used to route the data to the autonomous vehicle.

14. The method of claim 13, further comprising:

identifying, at the operations server computing system, a first multi-modal portion of the service request and a second multi-modal portion of the service request, the first multi-modal portion including a first transportation vehicle type, the second multi-modal portion including a second transportation vehicle type that is different from the first transportation vehicle type;

determining, at the operations server computing system, that the autonomous vehicle is compatible with the first transportation vehicle type; and identifying, at the operations server computing system, the first multi-modal portion as the portion of the service request that can be serviced by the autonomous vehicle.

15. The method of claim 13, further comprising associating, at the registry server computing system, data describing location information with the vehicle identifier, wherein identifying the portion of the service request is based on the location information.

16. The method of claim 13, further comprising transmitting status data from the vehicle computing system onboard the autonomous vehicle to the registry server computing system, the status data comprising the vehicle identifier.

17. The method of claim 16, wherein the status data describes at least one of a status associated with a vehicle service or a location of the autonomous vehicle associated with a vehicle service.

18. A system for automatically assigning vehicle identifiers for autonomous vehicles, the system comprising:

a registry server computing system comprising one or more computing devices;

an operations server computing system comprising one or more computing devices;

one or more processors; and one or more non-transitory computer-readable media that collectively store instructions that, when executed by the one or more processors, cause the system to perform operations, the operations comprising:

receiving, at the registry server computing system, vehicle identification data, the vehicle identification data identifying an autonomous vehicle;

generating, at the registry server computing system, a vehicle identifier for the autonomous vehicle based on applying a hash transformation function to the vehicle identification data, the vehicle identifier different than and distinct from the vehicle identification data;

associating, at the registry server computing system, the vehicle identification data with the vehicle identifier for the autonomous vehicle in a vehicle registry;

receiving, at the registry server computing system from a database server computing system, additional information describing the autonomous vehicle;

receiving, by a routing service at the operations server computing system comprising one or more computing devices, a multi-modal service request from a user, the service request including at least one of a pickup location, a destination location, or a service type;

querying the vehicle registry using the vehicle identifier generated by the hash transformation function to retrieve autonomous vehicle characteristics, the autonomous vehicle characteristics including at least one of autonomy capabilities, software version, or vehicle configuration;

identifying, by the routing service, at least a portion of the multi-modal service request that can be serviced by the autonomous vehicle based on matching the autonomous vehicle characteristics from the vehicle registry to requirements of the multi-modal service request; and transmitting the vehicle identifier generated by the hash transformation function with data indicative of the portion of the multi-modal service request to the autonomous vehicle via at least one of a plurality of intermediate server devices, wherein the vehicle identifier is used to route the data to the autonomous vehicle.

19. The system of claim 18, wherein the operations further comprise:

identifying, by the routing service, a first multi-modal portion of the multi-modal service request and a second multi-modal portion of the multi-modal service request, the first multi-modal portion including a first transportation vehicle type, the second multi-modal portion including a second transportation vehicle type that is different from the first transportation vehicle type;

determining, by the routing service, that the autonomous vehicle is compatible with the first transportation vehicle type; and identifying, by the routing service, the first multi-modal portion as the portion of the multi-modal service request that can be serviced by the autonomous vehicle.

20. The system of claim 18, wherein the operations further comprise associating, at the registry server computing system, data describing location information with the vehicle identifier, wherein identifying the portion of the multi-modal service request is based on the location information.

* * * * *